United States Patent
Abdelkader et al.

(10) Patent No.: US 10,415,144 B2
(45) Date of Patent: Sep. 17, 2019

(54) PRODUCTION OF GRAPHENE OXIDE

(71) Applicant: The University of Manchester, Manchester (GB)

(72) Inventors: Amr Abdelkader, Manchester (GB); Ian Kinloch, Manchester (GB); Robert Dryfe, Manchester (GB)

(73) Assignee: The University of Manchester, Manchester (GB)

( * ) Notice: Subject to any disclaimer, the term of this patent is extended or adjusted under 35 U.S.C. 154(b) by 409 days.

(21) Appl. No.: 15/038,398

(22) PCT Filed: Nov. 20, 2014

(86) PCT No.: PCT/GB2014/053435
§ 371 (c)(1),
(2) Date: May 20, 2016

(87) PCT Pub. No.: WO2015/075455
PCT Pub. Date: May 28, 2015

(65) Prior Publication Data
US 2016/0298244 A1    Oct. 13, 2016

(30) Foreign Application Priority Data

Nov. 20, 2013    (GB) .................................. 1320503.4

(51) Int. Cl.
| | | |
|---|---|---|
| *C01B 32/23* | (2017.01) | |
| *C25B 1/00* | (2006.01) | |
| *C25B 9/08* | (2006.01) | |
| *B82Y 35/00* | (2011.01) | |

(52) U.S. Cl.
CPC ................ *C25B 1/00* (2013.01); *C01B 32/23* (2017.08); *C25B 9/08* (2013.01); *B82Y 35/00* (2013.01); *Y10S 977/734* (2013.01); *Y10S 977/842* (2013.01)

(58) Field of Classification Search
CPC ....... C01B 32/23; C25B 1/00; Y10S 977/734; Y10S 977/842
See application file for complete search history.

(56) References Cited

U.S. PATENT DOCUMENTS

| | | | | |
|---|---|---|---|---|
| 7,790,285 B2* | 9/2010 | Zhamu | ................... | B82Y 30/00 428/402 |
| 2009/0026086 A1 | 1/2009 | Zhamu et al. | | |
| 2009/0028778 A1* | 1/2009 | Zhamu | ................... | B82Y 30/00 423/448 |
| 2010/0055458 A1 | 3/2010 | Jang et al. | | |
| 2013/0161199 A1* | 6/2013 | Li | .............................. | C25B 1/00 205/341 |
| 2013/0164208 A1* | 6/2013 | Hsieh | ........................ | C25B 1/00 423/448 |
| 2015/0010788 A1* | 1/2015 | Aria | ....................... | H01M 4/362 429/50 |
| 2015/0021196 A1* | 1/2015 | Zhamu | ................... | C01B 32/184 205/615 |

FOREIGN PATENT DOCUMENTS

| | | |
|---|---|---|
| CN | 102465309 A | 5/2012 |
| CN | 103058174 A | 4/2013 |
| WO | 2012/120264 A1 | 9/2012 |
| WO | WO-2012120264 A1 * | 9/2012 ............. B82Y 30/00 |

OTHER PUBLICATIONS

Abdelkader et al., "High-yield electro-oxidative preparation of graphene oxide," *Chem. Commun.* 50, 15 pages, 2014.
You et al., "An Electrochemical Route to Graphene Oxide," *Journal of Nanosczence and Nanotechnology* 11:5965-5968, 2011.

* cited by examiner

*Primary Examiner* — Salil Jain
(74) *Attorney, Agent, or Firm* — Seed IP Law Group LLP

(57) ABSTRACT

A method for the production of graphene oxide and/or graphite oxide nanoplatelet structures having a thickness of less than 100 nm in an electrochemical cell, the cell comprising: (a) a positive electrode that is graphitic; (b) a negative electrode that may be graphitic or another material; (c) an electrolyte including: (i) organic anions in a solvent; (ii) non-oxidant polyatomic anions in a solution; and/or (ii) polyatomic anions in a solvent wherein the electrolyte has a hydrogen ion concentration of $<1\times10^{-1}$ mol dm$^{-3}$; wherein the method comprises the step of passing a current through the cell to intercalate the anions into the graphitic positive electrode so as to exfoliate the graphitic positive electrode.

5 Claims, 12 Drawing Sheets

PRODUCTION OF GRAPHENE OXIDE

FIELD OF INVENTION

The present invention relates to a method for the production of graphene oxide and related graphite oxide nanoplatelet structures.

BACKGROUND

Graphene is an atomically thick, two-dimensional sheet composed of $sp^2$ carbons in a honeycomb structure. Graphite (3-D) is made by stacking several layers on top of each other, with an interlayer spacing of ~3.4 Å.

Graphene oxide (GO), graphene's oxygenated and hydrophilic counterpart, comprises carbon sheets having oxygen functional groups on the sheet basal planes and/or edges. In other words, graphene oxide is oxygenated graphene, which contains C—O bonds where the carbon is $sp^3$ hybridised and/or C=O bonds where the carbon is $sp^2$ hybridised. It has also attracted much attention in recent years due its potential applications ([Klinowski 1998], [Titelman 2005], [Dikin 2007]). Of particular interest is the fact that GO nano-sheets are soluble in water and have oxygen-containing functional groups on their surfaces ([Klinowski 1998] and [Titelman 2005]). These properties make them very attractive for applications such as energy-related materials, sensors, and bio-applications [Park 2010]. GO is also a promising candidate for the preparation of paper-like materials [Chen 2009]. More importantly, GO is considered as a promising precursor for the large-scale production of graphene-based materials owing to its relatively low cost of synthesis [Chen 2009] and [Stankovich 2007].

Chemical Methods of Preparing Graphene Oxide

The first syntheses of graphene oxide were reported over a century ago. In 1859, Brodie demonstrated the first synthesis of GO by adding potassium chlorate to a slurry of graphite in fuming nitric acid [Brodie 1859]. Staudenmaier later improved this method by adding the chlorate in small portions over the course of the reaction [Staudenmaier 1898]. He also added concentrated sulfuric acid to increase the acidity of the mixture. This slight change in the procedure resulted in an overall increase in the extent of oxidation.

In 1958, Hummers and Offeman introduced the most currently used method to prepare GO [Hummers 1958]. They oxidized graphite with $KMnO_4$ and $NaNO_3$ in concentrated $H_2SO_4$.

After oxidizing bulk graphite, GO sheets were exfoliated from the oxidized bulk via sonication in aqueous solution.

A drawback of these oxidative chemical methods, however, is that they need to be conducted over a period of days. These methods also involve the handling of highly reactive acids and oxidants and require extensive work-up of the reaction mixture once the reaction has completed, for example to dispose of the harmful acid and oxidants and to treat the toxic gaseous bi-product(s) $NO_2$, $N_2O_4$, and/or $ClO_2$ (the latter also being explosive [Dreyer 2010]). Thus, these methods are not ideal for industrial scale production. In addition, the extensive sonication treatment necessary to drive effective exfoliation of the graphene sheets in these reactions tends to break the GO sheets and therefore limit the flake sizes that may be produced.

Electrochemical Methods of Producing Graphene Oxide

Disclosures of electrochemical methods for producing graphene are well reported in the literature. For example, Liu et al. [Liu 2008] reported the exfoliation of graphite using an ionic liquid-water mixture electrolyte to form "kind of IL-functionalized" graphene nano-sheets. Lu et al. [Lu 2009] showed that the graphene nano-sheet production in Liu's method was at the anode and is due to an interaction of decomposed water species and the anions from the ionic liquid, such as $BF_4^-$. The present inventors have also reported in WO2012/120264 a method of producing graphene by the electrochemical insertion of alkylammonium cations in a solvent into graphite. Another electrochemical method for producing graphene has also been published in WO2013/132261 whereby double intercalation of graphite into the negative electrode occurs with metal and organic ions. In these methods, the emphasis is naturally placed on providing non-oxidative conditions to maximise the production of graphene.

However, only more recently have electrochemical methods of producing graphene oxide have been reported. For instance, You et al. [You 2011] describes a two-step process whereby graphite is first expanded by concentrated sulfuric acid to force the graphite crystal lattice planes apart and introduce reactive intercalating ions (e.g. sulphate ions) between the graphite layers. This expanded graphite was then subject to electrochemical exfoliation in an aqueous electrolyte solution of 1M potassium chloride over 10 hours. The authors propose that the chloride ions intercalate in the pre-expanded graphite anode and react to produce chlorine gas bubbles between the graphene layers. The chlorine is proposed to electrochemically oxidise the graphene layers whilst the bubbles provide a crucial additional expansion force to separate the layers leading to exfoliation of GO sheets. It is also probable that the pre-intercalated sulphate ions also contribute to the oxidation and expansion process. This process is conducted over a shorter time-scale compared to the chemical methods described above (hours rather than days). However, this method suffers from similar drawbacks to the conventional chemical oxidation methods described above in that highly reactive materials are used and produced, e.g. concentrated acid is required to first prepare an expanded graphite starting material and the electrochemical reaction produces reactive chlorine gas (and probably other harmful gaseous products such as $ClO_2$). Additionally, the requirement for a graphite pre-expansion step also adds procedural complexity. For these reasons, this method is not an ideal candidate for industrial scale production of graphene oxide.

US2013/0161199A1 describes a method for the electrochemical production of graphene and graphene oxide by intercalation and exfoliation of graphite starting material. In particular, this document teaches the use of a first bias voltage to effect intercalation of ions from an electrolyte into the graphite layers followed by application of a second (i.e. increased) bias voltage to drive exfoliation of the graphite to form graphene and graphene oxide and the subsequent filtration of the electrolyte to isolate the exfoliated product. Higher bias voltages and higher acidity of the electrolyte are taught to be required to produce graphene oxide via this method (see e.g. paragraph 54). The use of powerful chemical oxidants such as potassium bichromate, permanganic acid and potassium permanganate is also proposed (paragraph 40). Thus, this method has similar drawbacks to the [You 2011] method described above in its requirement for a more procedurally complex two-step intercalation-exfoliation procedure, use of reactive electrolyte materials and a requirement for higher voltages to effect for exfoliation would be arguably more energy consuming than if lower voltages were used and so less desirable from an industrial perspective.

As is evident from the above comments, further methods for the production of graphene oxide/graphite oxide nanoplatelet structures are desired so as to mitigate or obviate one or more of the problems identified above. In particular, methods are desired that produce graphene oxide sheets with a controlled number of layers and flake size.

Advantageously, the methods should be scalable to allow for the production of graphene oxide on a large (preferably industrial) scale. For instance, there is a desire to provide new methods that produce graphene oxide/graphite oxide nanoplatelet structures selectively over other oxidised carbon allotropes, which avoid handling of highly reactive starting materials/products, which are amenable to scale-up to an industrial platform, which are more efficient, reliable, environmentally friendly, provide higher quality material, provide increased yields of material, provide increased oxidation levels, provide larger sheets of material, provide easier isolation of material, which are procedurally simpler and/or which are cheaper than the methods of the prior art.

SUMMARY OF INVENTION

At its most general the present disclosure proposes an electrochemical method for preparing graphene oxide by electrochemical exfoliation driven by the electrochemical intercalation of anions into a positive graphitic electrode (i.e. anode), whereby the electrochemical intercalation, exfoliation and oxidation of graphite to graphene oxide at the positive electrode is conducted not in harshly corrosive and/or oxidative conditions as with conventional methods, but with electrolytes that provide a comparatively less corrosive and/or oxidative environment at the graphitic anode.

Typically, prior art intercalation/exfoliation processes for producing graphene oxide from graphite require highly oxidative/acidic conditions, which provide a highly corrosive environment, leading to high levels of electrode expansion in a relatively short space of time due to the aggressive way in which the acid attacks the anode, the aggressive way in which the typically oxidative anions are drawn between the graphite layers by the positive electrode potential, and the way in which these anions contribute directly to the oxidation of the graphite.

A high level of graphite expansion is conventionally understood to be desirable in electrochemical exfoliation methods since this is indicative of high levels of ionic intercalation and thus increased separation of graphene layers, which are understood to be easier to exfoliate. This understanding is exemplified by You, et al. [You 2011], where pre-expansion of graphite using concentrated sulfuric acid is performed prior to electrochemical exfoliation and oxidation whereby chlorine gas bubbles formed within the anode during the electrochemical process provide further oxidation and expansion of the anodic graphite.

On further investigation, the inventors observed that the rapid levels of expansion which are typical of highly acidic/oxidative processes can lead to the premature separation of large graphite pieces from the electrode body. Without wishing to be bound by theory, the present inventors propose contrary to conventional understanding that, in the context of producing graphene oxide, the corrosive action of acidic electrolytes and/or the fast and aggressive bombardment by anions into the graphitic anode at discrete defect sites can lead to significant separation of graphite layers at those discrete regions at a disproportionate rate to neighbouring anode regions. This is also observed when highly oxidative anions are used as these can thus cause aggressive and advanced oxidation at isolated regions in the graphite at a disproportionate rate to neighbouring anode regions. Both the presence of the oxidative anions and the increased cross-section of the graphene layers by additional graphene surface functionalisation caused by the resulting oxidation make these isolated regions prone to expanding disproportionately to surrounding regions as the layer thickness increases. This fast and disproportionate expansion creates distortion of the graphitic layers, leading to build up of localised mechanical and/or oxidative stress, causing large pieces of graphite to break away from the electrode before more pervasive intercalation/oxidation/exfoliation of the anode in general can take place. As the separated graphite/graphite oxide flakes are then no longer connected to the electrical supply, they cannot then be further oxidised or exfoliated electrochemically, which thus impacts on the overall yield of graphene oxide and/or graphite oxide nanoplatelet material obtained.

Thus, in the context of production of graphene oxide by electrochemical exfoliation and intercalation of the anode, the inventors have found that by using organic anions (e.g. citrate and/or acetate ions), anions that have a limited capacity to oxidise the graphitic anode, and/or less acidic electrolyte conditions, graphene oxide is obtainable in suitable yields and thickness (e.g. one, two and/or few layer graphene oxide can be produced) whilst maintaining desirable oxidation levels. This is surprising given that fast and significant expansion are conventionally thought to be necessary alongside the use of highly oxidising species and/or highly acidic conditions to provide adequate amounts of graphene oxide from graphite using exfoliative methods.

DETAILED DESCRIPTION

In an aspect of the invention is thus provided a method for the production of graphene oxide and/or graphite oxide nanoplatelet structures having a thickness of less than 100 nm (i.e. by electrochemical oxidation of graphite) in an electrochemical cell, the cell comprising:

(a) a positive electrode that is graphitic;

(b) a negative electrode that may be graphitic or another material;

(c) an electrolyte including organic anions in a solvent;

wherein the method comprises the step of passing a current through the cell to intercalate the anions (i.e. the organic anions) into the graphitic positive electrode so as to exfoliate the graphitic positive electrode.

As noted above, the inventors have found that by using organic anions (e.g. citrate/acetate ions) to intercalate and exfoliate the anode, graphene oxide is obtainable in suitable yields and thickness (e.g. one, two and/or few layer graphene oxide can be produced) whilst maintaining desirable oxidation levels. The inventors have observed that electrical exfoliation of the graphitic anode using organic anions allows the more gradual and homogenous expansion of graphite. This is thought to be the result of less aggressive intercalation of these carbon-containing anions into the positive electrode as induced by the positive electrode potential. In line with the inventors' observations, this less aggressive behaviour means that structural defects in the graphite are attacked less vigorously by the intercalating anions and so there is a low tendency for isolated sites in the graphite to be separated at a disproportionate rate to neighbouring anode regions. This in turn means that there is less localised mechanical and/or oxidative stress, and so large pieces of graphite are less prone to breaking away from the electrode before more pervasive intercalation/oxidation/exfoliation of the graphitic anode in general can take place. Moreover, organic anions (such as citrate) are thought to stabilise the graphene oxide sheets once formed.

In a second aspect of the invention is also provided a method for the production of graphene oxide and/or graphite oxide nanoplatelet structures having a thickness of less than 100 nm (i.e. by electrochemical oxidation of graphite) in an electrochemical cell, the cell comprising:
 (a) a positive electrode that is graphitic;
 (b) a negative electrode that may be graphitic or another material;
 (c) an electrolyte including non-oxidant polyatomic anions in solution;
  wherein the method comprises the step of passing a current through the cell to intercalate the anions (i.e. the non-oxidant polyatomic anions) into the graphitic positive electrode so as to exfoliate the graphitic positive electrode.

As described above, when non-oxidant polyatomic anions are used to intercalate and exfoliate the graphitic anode, graphene oxide is obtainable in suitable yields and thickness (e.g. one, two and/or few layer graphene oxide can be produced) whilst maintaining desirable oxidation levels. The inventors observe that electrical exfoliation of the graphitic anode using non-oxidant polyatomic anions provides a less aggressive oxidative environment at the anode, thus providing a more gradual and homogeneous exfoliation of graphite to graphene oxide. In line with the inventors' observations, this less aggressive behaviour means that structural defects in the graphite are oxidised less vigorously, or suitably not at all, by the non-oxidant polyatomic anions. Suitably, the non-oxidant anions are not directly involved in the oxidation of the graphite (i.e. the anions do not donate atoms which participate directly in the graphite oxidation). Thus, these anions preferably therefore perform in a solely intercalating capacity, exposing the interlayer graphite sheets to other oxygenating species in the electrolyte solution, typically water. The anions of this aspect thus attack the graphite defects less vigorously, and once intercalated do not lead to the fast and disproportionate oxidative thickening of localised regions of the graphite. There is therefore less localised mechanical and/or oxidative stress in the graphite, and so large pieces of graphite are less prone to breaking away from the anode before more pervasive intercalation/oxidation/exfoliation of the graphitic anode in general can take place.

In a third aspect of the invention is provided a method for the production of graphene oxide and/or graphite oxide nanoplatelet structures having a thickness of less than 100 nm (i.e. by electrochemical oxidation of graphite) in an electrochemical cell, the cell comprising:
 (a) a positive electrode that is graphitic;
 (b) a negative electrode that may be graphitic or another material;
 (c) an electrolyte including polyatomic anions in a solvent, the electrolyte having a hydrogen ion (i.e. H$^+$) concentration of $<1\times10^{-1}$ mol dm$^{-3}$, such as wherein the electrolyte has a pH of $>1$;
  wherein the method comprises the step of passing a current through the cell to intercalate anions (i.e. the polyatomic anions) into the graphitic positive electrode so as to exfoliate the graphitic positive electrode.

As discussed above, when an electrolyte having a lower acidity is used (i.e. wherein the hydrogen ion concentration is $<1\times10^{-1}$ mol dm$^{-3}$—corresponding to a pH in an aqueous solution of $>1$), graphene oxide is obtainable in suitable yields and thickness (e.g. one, two and/or few layer graphene oxide can be produced) whilst maintaining desirable oxidation levels. The inventors observe that electrical exfoliation of the graphitic anode in electrolytes having a lower hydrogen ion concentration (higher pH) leads to less corrosive attack of the positive graphitic electrode at the outset of the electrochemical exfoliation process, thus resulting in the more gradual and homogenous expansion and ultimately, exfoliation of the graphitic anode. This conforms to the inventors' observation that the initial stage of electrochemical intercalation/exfoliation of graphite typically involves the corrosion of localised regions in the graphitic anode surface (see Examples section and corresponding discussions), leading to the localised influx of anions at that site. When a highly acidic environment is provided as in conventional methods of graphite oxidation, fast and disproportionate intercalation of anions at localised regions of corrosion in the graphite occurs, causing localised mechanical and/or oxidative stress in the graphite leading to the premature separation of graphite pieces. Because this corrosive process is mitigated by the use of higher pH electrolyte, large pieces of graphite are less prone to breaking away from the anode before more pervasive intercalation/oxidation/exfoliation of the graphitic anode in general can take place, leading to greater yields and/or exfoliation in the present processes.

The invention thus provides a method for the production of graphene oxide and/or graphite oxide nanoplatelet structures having a thickness of less than 100 nm (i.e. by electrochemical oxidation of graphite) in an electrochemical cell, the cell comprising:
 (a) a positive electrode that is graphitic;
 (b) a negative electrode that may be graphitic or another material;
 (c) an electrolyte including:
  (i) organic anions in a solvent;
  (ii) non-oxidant polyatomic anions in a solution; and/or
  (ii) polyatomic anions in a solvent wherein the electrolyte has a hydrogen ion concentration of $<1\times10^{-1}$ mol dm$^{-3}$, such as having a pH of $>1$;
 wherein the method comprises the step of passing a current through the cell to intercalate the anions into the graphitic positive electrode so as to exfoliate the graphitic positive electrode. In embodiments, the respective anions in (i), (ii), and (iii) may thus be the same or different.

The present disclosure thus provides a convenient, one-step/one-pot process for obtaining graphene oxide and related graphite oxide nanoplatelet materials having a thickness of less than 100 nm. As shown in the examples, embodiments of the invention can provide single/few layer graphene oxide in a reasonable time frame (5 h), whilst maintaining desirable levels of graphene oxidation. In preferred embodiments, excellent yields are obtainable (yields upwards of 85% are reported herein).

The methods disclosed in the aspects and embodiments above do not necessarily require the use of corrosive acids or oxidants that are typical of conventional methods and so handling requirements of the reagents and products as well as "cleaning" and/or working-up of the products is less onerous because of the comparatively mild and clean method of formation. This is a valuable advantage when considering the scale-up of the process. Furthermore, in contrast to prior art methods, the methods of the present disclosure do not necessarily need high temperature or sonication to achieve exfoliation. Suitable expansion of the graphite and separation of the graphitic layers is achieved merely by ion intercalation without the need for subsequent oxidation/reaction of the intercalated organic ions.

Moreover, the methods of the present invention enable the production of increased yields of graphene oxide whilst maintaining desirable levels of oxidation and graphene oxide thickness compared to other methods, thus providing excellent and indeed improved methods for producing graphene oxide. For instance, by comparison to the methods of the invention, the use of solutions of highly acidic nitric acid and/or sulphuric acid as conventionally used in oxidative methods of preparing graphene oxide (e.g. Hummer's-type processes) provide lower yields of graphene oxide (for example, 8% for nitric acid and sodium 10.2% for sulphuric acid) compared to methods of the invention (e.g. using citrate anions) and only marginally higher levels of oxidation were achieved using these oxidant/acidic methods (e.g. 18.9% wt for nitric acid and 19.4% wt for sulphate compared to 13.15% wt. oxygen for citrate).

Suitably, the advantages associated with the anions/electrolyte conditions of the present methods may be achieved without significant loss of the electrolyte, because the respective organic anions and non-oxidant anions tend not to be significantly depleted by the electrochemical process and so the electrolyte can in embodiments be recovered/recycled/reused.

In a further aspect of the invention is provided the use of organic anions in a method for the production of graphene oxide and/or graphite oxide nanoplatelet structures having a thickness of less than 100 nm in an electrochemical cell, wherein said organic anions are present in the electrolyte and intercalate the graphite anode so as to exfoliate the graphite anode.

In a further aspect of the invention is provided the use of non-oxidant polyatomic anions in a method for the production of graphene oxide and/or graphite oxide nanoplatelet structures having a thickness of less than 100 nm in an electrochemical cell, wherein said non-oxidant polyatomic anions are present in the electrolyte and intercalate the graphite anode so as to exfoliate the graphite anode.

As shown in the examples (see Example 8 and comparative example 1) when electrolytes as described in the present disclosure (such as citrate and/or acetate) are added to electrolyte systems containing oxidising anions such as nitrate, improved yields of graphene oxide are obtainable whilst maintaining suitably high oxidation levels. Thus, the addition of said electrolyte anions to electrochemical systems for producing graphene oxide leads to improved results. This also allows the reaction to be tailored by the addition of said anions in the electrolyte.

In a further aspect is provided a method for the production of graphene oxide and/or graphite oxide nanoplatelet structures having a thickness of less than 100 nm (i.e. by electrochemical oxidation of graphite) in an electrochemical cell, the cell comprising:

(a) a positive electrode that is graphitic;
(b) a negative electrode that may be graphitic or another material;
(c) an electrolyte including non-oxidant anions in a solvent;

wherein the method comprises the step of passing a current through the cell to intercalate the anions (i.e. the non-oxidant anions) into the graphitic positive electrode so as to exfoliate the graphitic positive electrode.

In a further aspect is provided a method for the production of graphene oxide and/or graphite oxide nanoplatelet structures having a thickness of less than 100 nm (i.e. by electrochemical oxidation of graphite) in an electrochemical cell, the cell comprising:

(a) a positive electrode that is graphitic;
(b) a negative electrode that may be graphitic or another material;
(c) an electrolyte including anions in a solvent, the electrolyte having a hydrogen ion concentration of $<1\times10^{-1}$ mol $dm^{-3}$, such as having a pH of $>1$;

wherein the method comprises the step of passing a current through the cell to intercalate anions (i.e. said anions above) into the graphitic positive electrode so as to exfoliate the graphitic positive electrode.

In a further aspect is provided a method for the production of graphene oxide and/or graphite oxide nanoplatelet structures having a thickness of less than 100 nm (i.e. by electrochemical oxidation of graphite) in an electrochemical cell, the cell comprising:

(a) a positive electrode that is graphitic associated with an electrode cohesion element;
(b) a negative electrode that may be graphitic or another material;
(c) an electrolyte including anions in a solvent; and
wherein the method comprises the step of passing a current through the cell to intercalate the anions into the graphitic positive electrode so as to exfoliate the graphitic positive electrode.

As seen in the examples, the inventors have found in the context of electrochemical preparation of graphene oxide that increased yields of graphene oxide are provided whilst simultaneously providing significantly increased levels of oxidation and desirable graphene oxide thickness if an electrode cohesion element is provided at the positive graphitic electrode. The cohesion element acts so as to increase cohesion between the graphite components in the graphitic positive electrode during the electrochemical process relative to when no cohesion element is provided, thereby reducing the separation of large pieces of graphite from the electrode (which then become disconnected to the electrical supply) following intercalation and expansion as described above. Thus, the electrode cohesion element acts so as to maintain electrical contact between the electrical supply and the graphite at the positive electrode for longer. This enables more pervasive intercalation, exfoliation and oxidation of the graphitic electrode.

For instance, in the context of graphene oxide production as described above, oxidation levels close to those achieved with conventional chemical methods (e.g. Hummer's method) can be achieved whilst providing significantly improved yields compared to those chemical methods and without requiring the harsh chemicals and use of complementary exfoliation techniques (e.g. such as use of ultrasonication) required to give suitable levels of graphene oxide. The extent of increase in the graphene oxide yield and oxidation levels obtained when using the electrode cohesion element described are significant and surprising, and are observed even when acidic and/or oxidant electrolytes are used (e.g. nitric acid and/or sulfuric acid).

Electrode Cohesion Element

Suitably, the electrode cohesion element is associated with the positive electrode in use so as to increase the cohesion between graphitic components/particles in the graphitic electrode during the electrochemical process. Thus, the electrode cohesion element may be in close proximity to, in contact with, or for instance an integral part of the positive electrode. Suitably, the electrode cohesion element acts so as to reduce, preferably prevent, separation of large pieces of graphite from the graphitic electrode during the electrochemical reaction. Suitably therefore the electrode cohesion element may act so as to maintain a larger portion of the graphite electrode in contact with the electrical supply for longer compared to when no cohesion element is provided, i.e. wherein the graphitic electrode is provided alone.

Necessarily, the electrode cohesion element allows intercalating anions from the electrolyte to enter the positive graphitic electrode (in order to facilitate intercalation and exfoliation of the positive graphitic electrode). In embodiments, the electrode cohesion element allows exfoliated graphene oxide and/or graphite oxide nanoplatelet structures having a thickness of 100 nm or less to pass from the electrode into the electrolyte solution.

The electrode cohesion element is selected so as to be suitably resistant to the electrochemical conditions provided in the reaction, including electrical and electrolyte conditions. More stable materials are for example required wherein the reaction is significantly acidic, basic and/or highly oxidant anions are used and/or wherein high bias voltages/current densities are used.

Suitably, the electrode cohesion element comes into direct physical contact with at least part of the positive electrode during the course of the electrochemical reaction. Thus in embodiments, a method of the aspect or embodiments above is provided wherein the electrode cohesion element is in direct physical contact with the positive graphitic electrode. The electrode cohesion element may or may not be in direct physical contact with the positive graphitic electrode from the outset of the electrochemical process. In preferred embodiments, the electrode cohesion element is in direct physical contact with the positive graphitic electrode from the outset of the electrochemical process.

Direct Physical Contact

In embodiments the direct contact refers to wherein at least half, and preferably more than half, of the electrolyte-contacting surface of the positive electrode is in direct contact with the electrode cohesion element. In embodiments, the direct physical contact refers to contact between the electrolyte-contacting part of the positive electrode surface and the electrode cohesion element. "Electrolyte-contacting surface" in this regard refers to the part of the electrode surface which in use in the methods of the present disclosure is immersed in the electrolyte solvent. In embodiments, said direct contact refers to wherein substantially the entire electrolyte-contacting surface of the positive electrode is in direct contact with the electrode cohesion element, such as where all of the electrolyte-contacting surface of the positive electrode may be in direct contact with the electrode cohesion element. In this context, "substantially all" refers to wherein at least 90% by area, such as at least 95% by area, preferably at least 98% by area, e.g. at least 99% by area of the electrolyte-contacting surface of the positive electrode is in direct contact with the electrode cohesion element. In this regard, the electrode cohesion element and/or graphite electrode may be a material with an irregular surface such that it will be impossible for the whole graphite surface to contact the filter material. The skilled person will understand in such cases that the reference to surface area refers to the surface area of the electrode surface spanned by the filter material area contacting the surface. In embodiments, the positive electrode is at least partially enclosed by the electrode cohesion element, i.e. at least partially surrounded, typically at least half and preferably more than half, in embodiments substantially completely, typically completely enclosed by the electrode cohesion element. In embodiments, the reference to the electrode being enclosed refers to the whole graphitic electrode, but typically refers only to the electrolyte-contacting surface area of the electrode, i.e. the part of the electrode immersed in the electrolyte solution.

The electrode cohesion element may in embodiments be a porous filter (such as a muslin cloth or a porous plastic film or porous plastic box). Said porous filter is typically provided around at least part of the outer electrolyte-contacting surface of the positive electrode. Suitably therefore, the positive electrode may be at least partially enclosed by a porous filter, such as a porous membrane. The use of a porous filter having these properties thus also allows for easy removal of unreacted graphitic electrode material following the reaction, thus aiding the isolation of graphene oxide reaction product and unreacted graphitic reaction products.

Porous Filter

Any suitable porous filter may be used, provided that it allows the electrolyte anions to access the graphitic electrode in order to facilitate intercalation of electrolyte anions into the positive graphitic electrode (i.e. suitably whilst preventing large pieces of graphite from breaking away from the main body of the graphitic electrode into the electrolyte). The porous filter is suitably provided in methods of the invention so as to restrict (i.e. physically) fragmentation of the positive graphitic electrode during the electrochemical step. "Fragmentation" in this context refers to the separation of large pieces of graphite (i.e. which have not been substantially oxidised/exfoliated) from the graphitic electrode.

In some embodiments, the pore size may vary from 10 nm to 500 microns. In embodiments, the average pores size is at least 20 nm, for instance at least 50 nm, such as at least 100 nm, 20 nm, 300 nm, 400 nm, or 500 nm. In embodiments, the average pore size are at least 1 micron, 10 micron, 20 micron, 50 micron, 100 micron, 110 micron, 120 micron, 130 micron, 140 micron, 150 micron, 160 micron, 170 micron, 180 micron, 190 micron, 200 micron, 210 micron or 220 micron. In embodiments of the above embodiments, the average pore size may be 500 microns or less, 400 microns or less, 300 microns or less, preferably less than 250 microns. Typically, the porous filter has an average pore size of between 100 to 250 micron, such as between 110 to 220 micron, for instance between 120 to 210 micron, such as between 130 to 200 micron.

In embodiments the porous filter comprises a porous woven material such as a woven cloth, e.g. a muslin cloth, a polymeric membrane or a plastic (such as wherein the electrode is provided encased in a plastic box). Preferred membranes are flexible (in order to maintain contact with the electrode as the electrode surface area changes during the reaction process). Thus in embodiments, the porous filter includes (a) a cellulose dialysis membrane (e.g., Spectra Por 7, 25 nm pores); (b) polycarbonate membranes (e.g. around 450 nm pores) (c) muslin cloth (e.g. average pore size of around 120-140 microns, such as 130 microns) or (d) a plastic box (e.g. average pore size of around 190-210 microns, such as 200 microns). The porous filter may thus comprise a combination of one or more thereof. Where the porous filter comprises said porous material, it may optionally consist of at other non-porous components. Typically however, it consists solely of porous material. In embodiments wherein the porous filter comprises said material, it may consist of at least half of said material, suitably substantially all of the porous membrane material may consist of said material and suitably all of the porous membrane material consisting of said material. In other words, typically, the porous membrane material is said porous material as described above.

Anions

In this aspect and embodiments, the anions in a solvent may be any suitable anions. In suitable embodiments, the anion may be an anion as defined herein for any of the aspects and embodiments above. The anions may be non-oxidant anions (such as defined herein below), suitably non-oxidant polyatomic anions. Thus, in embodiments, the anions do not comprise nitrate or sulphate anions. In preferred embodiments, the anions are organic anions, such as defined herein below.

In embodiments of the above aspect and embodiments, the electrode cohesion element is provided so as to increase yield of the graphene oxide and/or so as to increase oxidation levels of the graphene oxide, i.e. relative to reactions wherein the electrode cohesion element is not provided.

In a further aspect is provided the use of an electrode cohesion element in an electrochemical method for the production of graphene oxide and/or graphite oxide nanoplatelet structures having a thickness of less than 100 nm (i.e. by electrochemical oxidation of graphite) in an electrochemical cell, the method comprising the association of the electrode cohesion element with the positive graphitic electrode. In particular embodiments, the cell comprises:

(a) a positive electrode that is graphitic associated with the electrode cohesion element;
(b) a negative electrode that may be graphitic or another material;
(c) an electrolyte including anions in a solvent; and
wherein the method comprises the step of passing a current through the cell to intercalate the anions into the graphitic positive electrode so as to exfoliate the graphitic positive electrode.

In accordance with this aspect and embodiments, the respective method features, e.g. the positive and negative electrodes, the electrode cohesion element, electrolyte and the method conditions may be as defined for any of the other aspects and embodiments described herein. For instance, in the aspect above, the electrode cohesion element may be as defined for any of the previous aspect and embodiments thereof above.

In a still further aspect is provided graphene oxide and/or graphite oxide nanoplatelet structures having a thickness of 100 nm or less as produced by a method of any of the above aspects and embodiments as defined herein. In embodiments, the graphene oxide and/or graphite oxide nanoplatelet structures are as described herein below.

Organic Anions

Where organic anions are used in the methods, uses and embodiments of the present invention, any suitable organic anions may be used. The organic anions may be branched or unbranched, cyclic or acyclic. Typically they are acyclic and/or branched.

Typically, the negative charge of the anion resides on a heteroatom or is delocalised into a heteroatom-containing conjugated system (such as in carboxylate anions). Suitably there may be one or more heteroatoms, typically more than one. Preferably the heteroatoms are selected independently from nitrogen and oxygen, preferably oxygen. Thus, preferably, the organic anions comprise one or more types of oxygen-containing anion. In this regard, where the organic anions include oxygen-containing organic anions, at least half and suitably more than half of the organic anions are oxygen-containing organic anions, and in embodiments substantially all of the organic anions are oxygen-containing anions (e.g. >90%, >95%, >98% or preferably >99% by weight of the total amount of organic anions in the electrolyte), preferably all of the organic anions are oxygen-containing organic ions.

Additionally or alternatively, the organic anions may include, and in embodiments consist of, non-oxidant organic anions, such as non-oxidant polyatomic organic anions.

The respective organic anions may typically consist of one compound type but may in embodiments be a combination of two or more organic anionic species, such as 2, 3, 4 or 5, e.g. 2.

The organic anions may comprise one or more anionic groups, suitably 1, 2, 3, 4, or 5, preferably from 1 to 3, such as 3.

"Oxygen-containing organic anion" refers to an organic anion containing one or more oxygen atoms. The oxygen-containing organic anion may be an anionic organic compound wherein at least one H in a C—H bond is notionally substituted by an oxygen substituent. Typically, more than one oxygen substituents are provided (e.g. 1, 2, 3, 4, or 5 oxygen substituents) and/or wherein one or more methylene groups (i.e. —CH$_2$—) in the organic anion (e.g. 1, 2, 3, 4, or 5 methylene groups) is notionally replaced by an oxygen (i.e. —O—). The oxygen containing organic anion may be a hydrocarbon wherein one or more hydrogen atoms is notionally substituted by one or more oxygen substituents (e.g. 1, 2, 3, 4, or 5 oxygen substituents) and/or wherein one or more methylene groups (i.e. —CH$_2$—) in the hydrocarbon (e.g. 1, 2, 3, 4, or 5 methylene groups) is notionally replaced by an oxygen (i.e. —O—). Thus, the term oxygen-containing organic anion includes hydrocarbons substituted by one or more oxygen substituents selected independently from the group consisting of —OH and =O; and/or wherein one or more methylene groups (i.e. —CH$_2$—) (e.g. 1, 2, 3, 4, or 5 methylene groups) is replaced by an oxygen (i.e. —O—) (e.g. forming an ether moiety) provided one or more anionic groups is present. More than one of said —OH and =O groups may be bonded to the same carbon atom. For instance, a carboxylic acid/carboxylate is formed when —O(H) and =O substituents are bonded to the same terminal carbon atom and a carboxylic acid ester results when a =O substituent is bonded to a carbon atom adjacent to an ether oxygen atom. The skilled person will understand that substitution with =O involves the notional substitution of two hydrogen atoms attached to the same carbon. Suitably, wherein more than one methylene group is substituted by an oxygen, no more than two oxygen atoms may be adjacent, i.e. suitably, chains of three or more oxygen atoms are not included. Examples of oxygen-containing organic anions are therefore anions containing alcohols (and/or alkoxides), epoxides, aldehydes, ketones, carboxylic acids (and/or carboxylates), carboxylic acid esters, amides, carbamates, ureas, ethers, peroxides and peracids (and/or percarboxylates).

For instance, in embodiments, the oxygen-containing organic anion is an oxygen-containing organic anion substituted by one or more substituents (e.g. 1, 2, 3, 4, or 5 substituents) selected independently from the group consisting of —OH and =O; and/or wherein one or more methylene groups (i.e. —CH$_2$—) (e.g. 1, 2, 3, 4, or 5 methylene groups) is replaced by an oxygen (i.e. —O—). In suitable embodiments, said substituted oxygenated organic anion is a hydrocarbon substituted by one or more —OH and =O groups, for instance wherein said substituted hydrocarbon is a carboxylic acid, which may include one or more carboxylate groups, e.g. from 1 to 3 groups, such as 1, 2, or 3.

In the embodiments above, when one or more methylene groups (i.e. —CH$_2$—) (e.g. 1, 2, 3, 4, or 5 methylene groups) are substituted by oxygen (i.e. —O—), preferably only one methylene group (i.e. —CH$_2$—) is substituted by an oxygen (i.e. —O—). In alternative embodiments, more than one methylene group (i.e. —CH$_2$—) is substituted by oxygen (i.e. —O—), e.g. 2, 3, 4, or 5 methylene groups are substituted. Suitably, 2, 3, or 4 methylene groups are substituted, for instance 2 or 3, particularly 2.

In preferred embodiments, the oxygen-containing organic anions include carboxylate compounds (carboxylates). In embodiments the organic anions consist of at least half, typically more than half, preferably substantially consist of (i.e. >90 mol % or 90% wt of the oxygen containing anions), such as consist of (as close to 100% as possible) carboxylates. Carboxylates may comprise one or more carboxylate/carboxylic acid groups per anionic molecule, such as 1, 2, 3, 4, or 5, typically 1 to 3, e.g. 1, 2 or 3, for instance 3.

The term "carboxylate" includes organic anions (for instance hydrocarbons) optionally substituted according to any definition as described above, wherein an —O$^-$ and =O are bonded to the same carbon atom to form a carboxylate moiety. Typically, from 1-5 carboxylate groups are provided in any one carboxylate anion, preferably 1-3, e.g. 1. Thus, the term "carboxylate" includes optionally substituted alkanoates, alkenoates and alkynoates including one or more carboxylate groups, such as one to three carboxyl groups, preferably one carboxyl group. Typically the carboxylate contains from 1-25 carbon atoms, such as from 1-10, preferably 1-6, more preferably 1-4 carbon atoms, e.g. one or two).

Thus, suitably, the carboxylate may be selected from the group consisting of an alkanoate, an alkenoate and an alkynoate, such as selected from an alkanoate and an alkenoate. In embodiments, the terms alkanoate, alkenoate and alkynoate as recited above refer to $C_{1-10}$alkanoates, $C_{3-10}$alkenoates and $C_{3-10}$alkynoates, more preferably a $C_{1-6}$alkanoates, $C_{3-6}$alkenoates and $C_{3-6}$alkynoates, e.g. selected from a $C_{1-4}$alkanoate, $C_{3-4}$alkenoate and $C_{3-4}$alkynoate. Typically, the carboxylate is a $C_{1-10}$alkanoate. For instance, when the carboxylate anion is a $C_{1-10}$alkanoate, it is suitably a $C_{1-6}$alkanoate or a $C_{1-4}$alkanoate (e.g. formate, acetate, propanoate or butanoate). More preferably, the carboxylate is selected from one or more of acetate and citrate. Other examples of carboxylates will be apparent to the skilled reader, such as including pentanoate, hexanoate, heptanoate, octanoate, nonanoate, decanoate, undecanoate, Laurate, Tridecylate, Myristate, Palmitate, Margarate, stearate, arachidate, lactate, acrylate, succinate, acetoacetate, pyruvate, benzoate, salicylate, adipate, citrate, carboxylate salts of amino acids, glycerate, glycolate and tartarate.

Substituent Groups

The oxygen-containing organic anions as described herein above, e.g. the oxygen-substituted hydrocarbons, carboxylates, alkenoates, alkenoates and alkynoates, may be optionally substituted by one or more conventional substituent groups (e.g. 1, 2, 3, 4, or 5 substituents) other than oxygen, for instance more than one conventional substituent group. Alternatively, only one substituent group may be present provided that at least one oxygen containing group is present. In embodiments, the oxygen-containing anions are not further substituted with a substituent group other than an oxygen-containing group. Typically, substitution involves the notional replacement of a hydrogen atom with a substituent group, or two hydrogen atoms in the case of substitution by =NR.

Where substituted, there will generally be 1 to 3 substituents unless otherwise stated herein, in one embodiment 1 or 2 substituents, for example 1 substituent.

The optional substituent(s) may be selected independently from the groups consisting of halogen, NH$_2$, —NO$_2$, —CN, —N$^+$(C$_{1-6}$alkyl)$_2$O$^-$, —SOC$_{1-6}$alkyl, —SO$_2$C$_{1-6}$alkyl, —C(=O) NH$_2$, —C(=O)N(C$_{1-6}$alkyl)$_2$, —N(C$_{1-6}$alkyl)C(=O)O(C$_{1-6}$alkyl), —N(C$_{1-6}$alkyl)C(=O)N(C$_{1-6}$alkyl)$_2$, —OC(=O)N(C$_{1-6}$alkyl)$_2$, —N(C$_{1-6}$alkyl)C(=O)C$_{1-6}$alkyl, —C(=S)N(C$_{1-6}$alkyl)$_2$, —N(C$_{1-6}$alkyl)C(=S)C$_{1-6}$alkyl, —SO$_2$N(C$_{1-6}$alkyl)$_2$, —N(C$_{1-6}$alkyl)SO$_2$C$_{1-6}$alkyl, —N(C$_{1-6}$alkyl)C(=S)N(C$_{1-6}$alkyl)$_2$, —N(C$_{1-6}$alkyl)SO$_2$N(C$_{1-6}$alkyl)$_2$, —Z$^u$—C$_{1-6}$alkyl, —Z$^u$—C$_{3-6}$cycloalkyl, —Z$^u$—C$_{2-6}$alkenyl, —Z$^u$—C$_{3-6}$cycloalkenyl and —Z$^u$—C$_{2-6}$alkynyl, wherein Z$^u$ is independently S, NH or N(C$_{1-6}$alkyl). Typically, the optional substituent(s) is/are independently halogen, —CN, —N(C$_{1-6}$alkyl)$_2$ or —C(=O)NH$_2$.

Suitably, the organic anions do not react with the graphite during the electrochemical reaction. For instance, in embodiments, the organic anions are non-oxidant anions.

Polyatomic Anions

The term polyatomic anions includes anions formed of two or more atoms. Such ions may be organic or inorganic ions, preferably organic ions. Suitable organic ions are as described above. Preferably, the polyatomic anions are non-oxidant anions as described below.

Suitably, the polyatomic anions do not react with the graphite during the electrochemical reaction.

Non-Oxidant Anions

The term "non-oxidant anions" (e.g. as in non-oxidant polyatomic anions) in the context of the present disclosure refers to anions that do not oxidise graphite at the anode. Thus non-oxidant anions do not contribute directly to the oxidation of graphite. Typically, the anions do not form oxidising species by electrochemical degradation at the anode to the oxidation reaction.

Suitably, the non-oxidant anions do not react with the graphite during the electrochemical reaction.

In embodiments, non-oxidant anions have a standard reduction potential)(E° versus the normal hydrogen electrode of less than zero V, such as less than −0.1 V, −0.2 V, −0.5 V, −0.8 V, −1.0 V, e.g. less than −1.2, −1.4, −1.6, −1.8 or −2 V. Typically, the non-oxidant anions have a standard reduction potential (E°) versus the normal hydrogen electrode of more than −2V, e.g. more than −1.5V, such as more than −1.0 V, −0.8V, or −0.6V. Preferably, the non-oxidant anions have a standard reduction potential (E°) versus the normal hydrogen electrode of from −1 V to zero V, e.g. −0.8 to −0.2, such as −0.6 to −0.4 V. The skilled person will be able to determine standard electrode potential for a given substance and various reference tables are provided for example in [Milazzo, G. 1978], [Bard, A. J. 1985] and [Bratsch, S. G. 1989].

Suitable non-oxidant polyatomic anions thus include organic anions or inorganic anions. Suitable organic anions are defined herein above and include, for example, carboxylate anions such as citrate and acetate.

The present methods thus provide an advantage over prior art methods which use oxidising anions or monoatomic anions (such as halides) as these tend to directly oxidise the graphite (as in oxidant anions) and/or in the case of monoatomic anions such as halides, form highly oxidising gaseous species such as chlorine gas [You 2011], which can then oxidise the graphite, contributing to the premature separation of graphite pieces as discussed above.

Suitably, the non-oxidant anions do not react with the graphite during the electrochemical reaction.

In some embodiments of any aspect and embodiments disclosed herein, the respective anions (such as organic anions, non-oxidant anions, etc.) suitably do not include halide-containing anions.

Graphene Oxide and Graphite Oxide Nanoplatelet Structures

In the present application, the term "graphene oxide" is used to describe material consisting of ideally one to ten graphene oxide layers preferably where the distribution of the number of layers in the product is controlled.

Suitably, the graphene oxide and/or graphite oxide nanoplatelet structures of any of the above aspects and embodiments comprise at least 10% by weight of oxygen, typically more than 10% by weight, for instance, at least 12% by weight, such as at least 13% by weight, at least 14% by weight, at least 15% by weight, at least 20% by weight, at least 25% by weight, at least 30% by weight, or at least 35% by weight. In embodiments, the graphene oxide produced by methods of the disclosure has an oxygen content that does not exceed 30% by weight of oxygen, for example 20% wt. or less, such as 15% wt. or less. Typically, the graphene oxide produced has an oxygen content of between 10% and 30% by weight, such as 10% to 20% by weight 10%-15% wt, e.g. 12-15% wt.

In embodiments, the graphene oxide and/or graphite oxide nanoplatelet structures comprise at least 10 at % (atomic percentage) oxygen in the material based on the total number of atoms in the material, for instance more than 15 at %, such as more than 20 at %, 25 at %, 30 at %, 35 at %, 40 at % or 45 at %, for example at least 50 at %, such as up to 55 at %.

Where more than one "graphene oxide layer" is present in the graphene oxide, it is intended that one or more of the respective layers may contain the carbon-oxygen bonds (i.e. one or more of the layers may be oxygen-free). This also applies to graphite oxide nanoplatelet structures. Typically, every layer contains carbon-oxygen bonds. Such carbon-oxygen bonding may be in the form of any suitable oxygen-containing functionality (i.e. containing —C—O or C=O bonds) such as in the form of alkoxide, hydroxide, ether, epoxide, ketone, aldehyde, carboxylic acid, ester, anhydride, peracids and/or peroxides, etc. The skilled person will appreciate that such carbon-oxygen bonding disrupts the planar, conjugated 2D $sp^2$ parent graphene structure to form non planar spa hybridised carbon atoms.

In embodiments, the material produced may comprise at least 10% by weight of graphene oxide having up to ten layers, preferably at least 25% by weight and more preferably at least 50% by weight of graphene oxide having up to ten layers.

It may be preferred that the isolated material produced following the reaction is substantially free of graphene and/or graphite nanoplatelet structures (i.e. non-oxidised material). In the present application, the term "graphene" is used to describe materials consisting of one to ten graphene layers. "Substantially free" in the context of the presence of graphene and graphite nanoplatelet structures in the product material means less than 10% by weight, for instance less than 5% by weight, preferably less than 2% by weight, or more preferably less than 1% by weight of the material produced by the method is graphene and/or graphite nanoplatelet structures. Preferably, no graphene/graphite nanoplatelet structures are produced.

The process of the present invention produces graphene oxide and/or graphite nanoplatelet structures having a thickness of less than 100 nm. In embodiments, the process produces graphene oxide or graphite oxide nanoplatelet structures having a thickness of less than 100 nm or graphene. In embodiments, the process produces graphene oxide and graphite oxide nanoplatelet structures having a thickness of less than 100 nm. In embodiments, the process of the present invention produces graphene oxide. In embodiments, the process produces graphite oxide nanoplatelet structures having a thickness of less than 100 nm. The process of the present invention may for example produce graphene oxide or a combination of graphene oxide and graphite nanoplatelet structures having a thickness of less than 100 nm.

In embodiments, the process produces more graphene oxide by surface area than graphite oxide nanoplatelet structures having a thickness of less than 100 nm, preferably wherein substantially all material produced by the process is graphene oxide by surface area (wherein at least 90%, preferably at least 95%, more preferably at least 98%, e.g. at least 99% of the material produced by the process is graphene oxide by surface area), such as wherein all material produced by the process is graphene oxide. In embodiments, the process produces more graphene oxide by weight than graphite oxide nanoplatelet structures having a thickness of less than 100 nm, preferably wherein substantially all material produced by the process is graphene oxide by weight (wherein at least 90%, preferably at least 95%, more preferably at least 98%, e.g. at least 99% of the material produced by the process is graphene oxide by weight).

In embodiments, the graphene oxide consists of one to five layers, preferably one to four layers, more preferably one to three layers, for instance one to two layers, e.g. one layer. The graphene oxide produced may therefore have one, two, three, four, five, six, seven, eight, nine or ten layers. Thus, in embodiments, the material produced is graphene oxide having up to ten layers. The graphene oxide produced may have one, two, three, four, five, six, seven, eight, nine or ten layers.

The method can be used to make graphite oxide nanoplatelet structures under 100 nm in thickness. Thus in the above aspect and embodiments, the graphite oxide nanoplatelet structures under 100 nm in thickness may be for instance under 90 nm, 80 nm, 70 nm, 60 nm, 50 nm or under 40 nm in thickness, preferably under 30 nm, more preferably under 20 nm and in embodiments under 15 nm in thickness.

The graphene and/or graphite nanoplatelet structures produced by the present process may contain one or more functionalised regions. "Functionalised" and "functionalisation" in this context refers to the covalent bonding of an atom to the surface of graphene oxide and/or graphite oxide nanoplatelet structures other than carbon and oxygen atoms. Typically, the material produced by the present process is substantially free of functionalisation, for instance, wherein less than 10% by weight, such as less than 5% by weight, preferably less than 2% by weight, more preferably less than 1% by weight of the relevant product is functionalised. Additionally or alternatively, the material produced is preferably substantially free of functional groups other than carbon and oxygen groups. "Substantially free" in the context of the presence of functional groups other than carbon and oxygen groups means less than 20 at % (atomic percentage) atoms other than carbon and oxygen in the material based on the total number of atoms in the material, such as less than 15 at %, for instance less than 10 at %, or more particularly less than 5 at %, such as less than 2 at %, for example about the same at % functional groups other than carbon and oxygen as the graphitic starting material. Such functionalisation may for instance include functionalisation by halides. Preferably said graphene oxide includes less than 10% wt functionalisation by fluoride. In embodiments, the graphene oxide is substantially free of fluoride (i.e. contains less than 5% wt, less than 2% wt, or more particularly less than 1% wt. fluoride). In embodiments, the graphene oxide may include less than 10 at % functionalisation by fluoride, such as less than 5 at %, less than 2 at %, or more particularly less than 1 at % fluoride. Preferably, the graphene oxide is free of fluoride. In embodiments, said graphene oxide includes less than 10% wt functionalisation by halides. In embodiments, the graphene oxide is substantially free of halides (i.e. contains less than 5% wt, less than 2% wt, or more particularly less than 1% wt. halides). In embodiments, the graphene oxide may include less than 10 at % functionalisation by halides, such as less than 5 at %, less than 2 at %, or more particularly less than 1 at % halides. Preferably, the graphene oxide is free of halides.

The functionalisation, where present, may occur on the material surface and/or near or at the grain boundary. Typically, the functionalisation, where present, occurs at the grain boundary but not on the material surface. In preferred embodiments, the graphene oxide produced by the present process is not functionalised.

In other embodiments, it may be desirable to have higher levels of functionalisation. For example, the method may include a step of functionalising the material in the cell or following isolation of the material from the cell. Thus, in embodiments, the graphene oxide and/or graphite oxide nanoplatelet structures produced by the present process contain one or more functionalised regions such that more than 10% by weight, suitably more than 15% by weight, suitably more than 20% by weight, suitably more than 30% by weight, suitably more than 40% by weight, of the relevant product is functionalised. Additionally or alternatively, the material produced by the present process contains more than 5 at % total elements other than carbon and oxygen based on the total number of atoms in the material, suitably more than 10 at %, preferably more than 15 at %, preferably more than 20 at %, and more preferably more than 30 at %.

The atomic composition of material produced by the present process may be quantified by X-ray photoelectron spectroscopy (XPS). Raman spectroscopy (as described in the Examples) may be used to determine the level of defects in the material.

In embodiments, the material produced by the present process includes at least 4% by weight of graphene oxide having up to ten layers, suitably 6% by weight of graphene oxide having up to ten layers, such as 8% by weight of graphene oxide having up to ten layers, 10% by weight of graphene oxide having up to ten layers, preferably at least 25% by weight more preferably at least 50% by weight of graphene having up to ten layers, preferably at least 60% by weight, at least 70% by weight, at least 80% by weight, at least 90% by weight, at least 95% by weight, at least 98% by weight, more preferably at least 99% by weight. In embodiments, graphene oxide is produced in the absence of graphite oxide nanoplatelet structures.

Typically, the process of the present invention produces flakes of graphene oxide on the electrode and/or in the electrolyte, usually predominantly dispersed in the electrolyte. The size of the graphene flakes produced can vary from nanometers across to millimeters, depending on the morphology desired. The flakes produced are desirably at least 90 μm in length, such as at least 80 μm, 70 μm, 60 μm, 50 μm, 40 μm, 30 μm, 20 μm, 10 μm, or 5 μm, for example at least 1 μm, at least 0.8 μm in length, at least 0.5 μm in length, such as at least 1 μm in length. In embodiments, the flakes produced are 0.1 to 100 μm in length, such as 0.5 to 100 μm in length, 0.8 to 100 μm in length, or 1 to 100 μm in length, e.g. 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, or 1 to 5 μm in length.

Yield

The methods described herein are capable of producing high yields of graphene oxide and/or graphite nanoplatelet structures.

In embodiments, the yield of graphene oxide and/or graphite nanoplatelet structures having a thickness of less than 100 nm is >10%, such as >15%, >20%, >30%, >40%, >50%, >60%, >70%, >80% and preferably >85%.

Positive Electrode

The positive electrode is the electrode held at the more positive potential out of the negative and positive electrodes. An additional reference electrode may also be used (which may be any suitable material, such as $Ag/AgBF_4$).

The positive electrode is graphitic but may also comprise other materials, provided the graphitic portion is configured to contact and does contact the electrolyte when in use. The positive electrode may comprise a layered graphite compound in which anions can be intercalated. Preferred materials include highly ordered pyrolytic graphite (HOPG), natural and synthetic graphite. The electrode may be a single graphitic crystalline flake or many flakes held together. In the latter case, the crystals may be placed on a conductive surface, physically pressed together or held together using a binder such a pyrolysed polymer (e.g. an extruded graphite rod). They also may be held together in a porous box or basket. The minimum lateral dimensions of the graphite flakes are preferably at least 1 nm, more preferably at least 100 nm and most preferably at least 1 micron. The maximum lateral dimensions of the graphite flakes are preferably no more than 10 cm, more preferably no more than 1 mm and most preferably no more than 100 microns. In one embodiment, the flakes are orientated so that the [002] planes are perpendicular to the surface of the electrode, exposing the galleries for intercalation. In further embodiments, the maximum lateral dimensions of the graphite flakes are preferably no more than 100 microns, such as no more than 90 microns, e.g. no more than 80, 70, 60, 50, 40 30, 20 or 10 microns, for instance no more than 1 micron. Typically average graphite particle size of the positive graphitic electrode is no more than 100 microns, such as no more than 90 microns, e.g. no more than 80, 70, 60, 50, 40 30, 20 or 10 microns, for instance no more than 1 micron. Preferably, the average graphite particle size is between 1 and 30 microns, such as between 2 and 35 microns. For instance, the average graphite particle size may be between 10 and 30 microns, such as between 15 and 30 microns, such as between 20 and 28 microns, such as around 25 microns. In preferred embodiments, the average graphite particle size may be between 1 and 5 microns, such as between 2 and 5 microns, typically 3-4 microns, e.g. 3 microns. Alternatively the average graphite particle size may be around 4 microns.

The positive electrode material may be treated chemically, electrochemically, and/or mechanically prior to use in order to improve its electrochemical exfoliation. Mechanical manipulation includes ball-milling and thus, in embodiments, the positive graphitic electrode is ball-milled prior to performing the electrochemical the reaction. In embodiments, the treatment may involve partial pre-oxidation to form a graphitic electrolyte comprising partially oxidised graphite oxide. The material may additional or alternatively be partially exfoliated/expanded prior to commencing the electrochemical process. In one embodiment the electrode is made from material which has been previously partially exfoliated using other methods such acidic or gaseous expansion or intercalation from the vapour phase. For example, commercially available material from companies such as XG Sciences and Angstrom could be used for the electrode material. In preferred embodiments, the method does not use positive electrode material that has been partially expanded or exfoliated using other methods such acidic or gaseous expansion or intercalation from the vapour phase. Typically for example, the methods of the present disclosure do not use positive electrode material that has been treated prior to use in order to improve its electrochemical exfoliation.

In some embodiments, the positive electrode may be of a ladle design to avoid issues with disintegration of the electrode into large pieces. In other embodiment, the graphitic positive electrode may be held at a liquid-liquid interface. In such an embodiment, the positive electrode may be a liquid metal such as mercury or gallium on which graphite flakes are placed, allowing continual contact with the graphitic material as it is exfoliated into the desired material. Typically, the graphitic electrode is connected to the electrical supply via another conducting material (e.g. wherein the graphitic portion is a coat on a metal) or is itself in direct contact with the electrical supply, i.e. wherein the electrode consists of the graphitic material.

In embodiments, at least part of the positive electrode may be associated with an electrode cohesion element as defined above. Suitably, the electrode cohesion element is associated with the positive electrode in use so as to increase the cohesion between graphitic components/particles in the graphitic electrode during the electrochemical process. Suitably, the electrode cohesion element acts so as to reduce, preferably prevent, separation of large pieces of graphite from the graphitic electrode during the electrochemical reaction. Suitably therefore the electrode cohesion element may act so as to maintain a larger portion of the graphite electrode in contact with the electrical supply for longer compared to when no cohesion element is provided, i.e. wherein the graphitic electrode is provided alone.

Necessarily, the electrode cohesion element allows intercalating anions from the electrolyte to enter the positive graphitic electrode (in order to facilitate intercalation and exfoliation of the positive graphitic electrode). In embodiments, the electrode cohesion element allows exfoliated graphene oxide and/or graphite oxide nanoplatelet structures having a thickness of 100 nm or less to pass from the electrode into the electrolyte solution. The use of a porous filter having these properties thus also allows for easy removal of unreacted graphitic electrode material following the reaction, thus aiding the isolation of graphene oxide reaction product and unreacted graphitic reaction products.

The electrode cohesion element is selected so as to be suitably resistant to the electrochemical conditions provided in the reaction, including electrical and electrolyte conditions. More stable materials are for example required wherein the reaction is significantly acidic, basic and/or highly oxidant anions are used and/or wherein high bias voltages/current densities are used.

In embodiments, the electrode cohesion element comes into direct physical contact with at least part of the positive electrode during the course of the electrochemical reaction. Thus in embodiments, a method of the aspect or embodiments above is provided wherein the electrode cohesion element is in direct physical contact with the positive graphitic electrode. The electrode cohesion element may or may not be in direct physical contact with the positive graphitic electrode from the outset of the electrochemical process. In preferred embodiments, the electrode cohesion element is in direct physical contact with the positive graphitic electrode from the outset of the electrochemical process.

In embodiments the direct contact refers to wherein at least half, and preferably more than half, of the electrolyte-contacting surface of the positive electrode is in direct contact with the electrode cohesion element. In embodiments, the direct physical contact refers to contact between the electrolyte-contacting part of the positive electrode surface and the electrode cohesion element. "Electrolyte-contacting surface" in this regard refers to the part of the electrode surface which in use in the methods of the present disclosure is immersed in the electrolyte solvent. In embodiments, said direct contact refers to wherein substantially the entire electrolyte-contacting surface of the positive electrode is in direct contact with the electrode cohesion element, such as where all of the electrolyte-contacting surface of the positive electrode may be in direct contact with the electrode cohesion element. In this context, "substantially all" refers to wherein at least 90% by area, such as at least 95% by area, preferably at least 98% by area, e.g. at least 99% by area of the electrolyte-contacting surface of the positive electrode is in direct contact with the electrode cohesion element. In this regard, the electrode cohesion element and/or graphite electrode may be a material with an irregular surface such that it will be impossible for the whole graphite surface to contact the filter material. The skilled person will understand in such cases that the reference to surface area refers to the surface area of the electrode surface spanned by the filter material area contacting the surface. In embodiments, the positive electrode is at least partially enclosed by the electrode cohesion element, i.e. at least partially surrounded, typically at least half and preferably more than half, in embodiments substantially completely, typically completely enclosed by the electrode cohesion element. In embodiments, the reference to the electrode being enclosed refers to the whole graphitic electrode, but typically refers only to the electrolyte-contacting surface area of the electrode, i.e. the part of the electrode immersed in the electrolyte solution.

The electrode cohesion element may in embodiments be a porous filter as defined above (such as a membrane, muslin cloth or a porous plastic film or porous plastic box). Said porous filter is typically provided around at least part of the outer electrolyte-contacting surface of the positive electrode.

As described above, said electrode cohesion element (e.g. porous filter) is provided such that it restricts the fragmentation of the electrode during the electrochemical step. Necessarily, the electrode cohesion element (e.g. porous filter) allows access of the electrolyte to the positive graphitic electrode. In embodiments, the electrode cohesion element (e.g. porous filter) allows exfoliated graphene oxide and/or graphite oxide nanoplatelet structures having a thickness of 100 nm or less to pass from the electrode into the electrolyte solution. Suitably, the electrode cohesion element (e.g. porous filter) prevents large pieces of graphite from separating from the positive electrode during electrochemical exfoliation.

In embodiments at least half, and preferably more than half, of the electrolyte-contacting surface of the positive electrode is in direct contact with the electrode cohesion element (e.g. porous filter). Suitably, substantially all the electrolyte-contacting surface of the positive electrode is in direct contact with the porous filter, such as where all the electrolyte-contacting surface of the positive electrode is in direct contact with the porous filter. In this context, "substantially all" refers to wherein at least 90% by area, such as at least 95% by area, preferably at least 98% by area, e.g. at least 99% by area of the electrolyte-contacting surface of the positive electrode is in direct contact with the porous filter. In embodiments, the positive electrode is thus at least partially enclosed by the porous filter, i.e. at least partially surrounded, typically at least half and preferably more than half surrounded, in embodiments substantially completely surrounded, typically completely surrounded by the porous filter. Suitably therefore, the positive electrode may be surrounded by a membrane. Without wishing to be bound by theory, the use of the porous filter material (i.e. membrane) may help retain any exfoliated material in electrical contact with the positive electrode allowing for further intercalation of the anions. In some embodiments, the pore size may vary from 10 nm to 500 nm. Suitable porous membranes include (a) cellulose dialysis membrane (e.g., Spectra Por 7, 25 nm pores); and (b) polycarbonate membranes (e.g. 450 nm pores) and (c) muslin cloth.

Negative Electrode

The negative electrode is the electrode held at the most negative potential out of the two electrodes. A reference electrode may also be used.

The negative electrode may consist of any suitable material known to those skilled in the art as it does not play a role in the graphene oxide production, other than to provide a counter electrode for the cations. The negative electrode may thus be graphitic (i.e. wherein the graphitic part of the electrode is configured to be in contact with the electrolyte and contacts the electrolyte when in use) or be made of another material. An advantage of using a negative graphitic electrode is that the graphene oxide and/or graphite oxide nanoplatelet structures may be produced at both electrodes in the electrochemical cell according to the present method where alternating current (or switching mode, CV or other DC voltammetry that includes alternating the polarity of the electrodes) is used provided adequate time is provided between switching the potential for the anions to migrate. In other words, in such embodiments the intercalation of anions and subsequent production of graphene oxide still occurs at the positive electrode, but wherein the respective electrodes switch from positive to negative as a result of the alternating current. Suitably, the negative electrode may be made from a highly conducting inert material such as gold, platinum or carbon.

Thus, the negative electrode may be selected independently from any of the embodiments described herein above for the positive electrode, including embodiments provided with an electrode cohesion element (i.e. wherein an electrode cohesion element is associated with the negative electrode). The negative electrode may be identical or different in substance to the positive electrode, typically different. Where the positive electrode is identical in substance to the negative electrode, the electrodes will differ only in terms of their relative electrical potential. For instance, the negative electrode may include a material selected from the groups consisting of transition metals, transition metal-containing alloys, transition metal-containing oxides, transition metal-containing ceramics and combinations thereof. Preferably, the negative electrode is made from an inert material. In embodiments, the negative electrode includes gold, silver, platinum or carbon, preferably gold, silver or platinum, more preferably platinum. Platinum mesh is particularly suitable. In embodiments, the negative electrode consists substantially of said gold, silver, platinum or carbon (i.e. wherein at least 90% by weight of the electrode consists of said gold, silver, platinum or carbon, for instance at least 95% by weight, 98% by weight or 99% by weight). In embodiments, the negative electrode consists of said gold, silver, platinum or carbon. Suitably, said gold, silver, platinum or carbon is included at the surface of the electrode configured to contact the electrolyte, preferably wherein at least 10% by area of said electrode surface consists of said gold, silver, platinum or carbon, more preferably at least 20% by area, such as 30%, 40%, 50%, 60%, 70%, 80%, 90%, 95%, 98%, 99%, or more preferably 100% by area.

When the reaction at the negative electrode generates a gas, it is preferable to provide as large an electrode surface area as possible to prevent gas bubbles wetting it and/or disrupting the process at the positive electrode.

The negative and/or reference electrode may also be placed in a membrane or molecule sieve to prevent undesired reactions in the electrolyte or interference with the process at the positive electrode.

The positive and the negative electrodes could alternatively be placed in a two-compartment cell, wherein the each compartments contains one electrode, and the compartments are connected through a channel.

Electrolyte

In aspects and embodiments of the invention described above, the electrolyte may include anions (e.g. organic anions as in the first aspect and embodiments above and polyatomic anions as in the third aspect and embodiments above) in a solvent. In embodiments wherein the electrolyte comprises anions in a solvent, at least half and preferably more than half of the electrolyte consists of ions in a solvent, wherein the ions include said anions. Suitably, the electrolyte may consist substantially of, preferably consist of, ions in a solvent, wherein the ions include said anions. In this context, "consists substantially of" means that at least 90% wt., 95% wt., 98% wt. or preferably 99% wt. of the electrolyte is ions in a solvent, wherein the ions include said anions.

The anions in a solvent may be constituent anions of said solvent and/or may be dissolved in said solvent (i.e. as anions in a solution). Preferably, said anions in a solvent are anions in a solution, more preferably anions in an aqueous solution.

Other anions (e.g. solute anions) may be present alongside the intercalating anions of the above aspects and embodiments as described above as part of the solvent and/or as solutes dissolves in the solvent. Such additional anions may or may not also intercalate the graphitic positive electrode during the electrochemical reaction.

In some embodiments of aspects and embodiments above, said anions in a solvent (i.e. the organic anions, non-oxidant polyatomic anions and/or polyatomic anions) constitute at least 25% of, such as at least half and preferably more than half of all anions in the solvent. Suitably, said anions in a solvent constitute substantially all of, preferably all of, the anions in the solvent. In this context, "substantially all of" means that at least 90 mol %, 95 mol %, 98 mol % or preferably 99 mol % of the anions in the solvent are said anions. In embodiments of aspects and embodiments above wherein said anions are anions in a solution, the anions in solution (i.e. the organic anions, non-oxidant polyatomic anions and/or polyatomic anions) constitute at least 25% of, such as half and preferably more than half of all anions in the solution. Suitably, said anions in a solution constitute substantially all of, preferably all of, the anions in the solution. In this context, "substantially all of" means that at least 90 mol %, 95 mol %, 98 mol % or preferably 99 mol % of the anions in the solution are said anions.

The skilled person will appreciate that in some solution/solute systems, the solvent itself may dissociate to some extent such that the solvent itself forms anions and cations (e.g. in addition to solute anions and cations). This is typically the case when the solvent contains labile protons, e.g. when the solvent is water. Suitably, in the case where said anions are anions in a solution, the reference to anions refers to the solute anions (i.e. the ions dissolved in the solution) and not the solvent anions. In embodiments, the reference to anions does not include hydroxide ions when the electrolyte comprises anions in an aqueous solution. Thus, in some embodiments, the reference to anions in the methods of the present disclosure refers to anions other than hydroxide anions. In embodiments where the electrolyte is anions in a solution (i.e. solute anions) and the solvent is a self-dissociating solvent capable of producing anions, the reference above to the anions consisting of a proportion of all the anions in solution refers to solute anions. Thus, in embodiments wherein the electrolyte is anions in an aqueous solution, the reference to the anions consisting of a proportion of all the anions in solution does not include the hydroxide anions contributed by the water.

The skilled person will appreciate that the reaction mixture should contain a source of oxygen atoms in order to provide graphene oxide from a graphitic positive electrode. The oxygen atoms may for example be provided in the electrolyte in the form of an oxygen-containing solvent species or oxygen-containing solute. Preferably, the solvent is water.

In embodiments the respective anions defined in any of the aspects and embodiments above may be provided in combination in the same electrolyte. For instance, the organic anions of the first aspect may be provided in combination with non-oxidant polyatomic anions according to the second aspect and embodiments above.

The respective counter-cations to the respective anions in the solvents/solutions of the above aspects and embodiments may be any suitable cations and are typically selected from one or more of protons, metal cations, and organic cations. Metal cations may for instance be selected from, for example, iron, tin, lithium ions, and thus can be $Fe^{2+}$, $Fe^{3+}$, $Sn^{2+}$ and $Li^+$. The metal ions may also be selected from potassium, sodium, aluminium (e.g. $K^+$, $Na^+$ and $Al^{3+}$) and rare earth cations. In particular embodiments, the counter ion is sodium. The respective counterion(s) preferably do not attack the graphitic positive electrode.

In some embodiments, the concentration of the anions (i.e. the organic ions in the first aspect and embodiments, the non-oxidant polyatomic anions in the second aspect and embodiments and/or the polyatomic anions of the third aspect and embodiments) may be a minimum of 1 mM, 0.1 M, 0.2 M, 0.5 M, 1 M, 2 M, 4 M, 6 M, 8 M or 10 M, preferably at least 0.1 M. Typically no more than 20 M, 15 M, 10 M, 5 M, 2M, 1.5M or preferably no more than 1M concentration of anions is used. Most preferably about 0.2 M concentration of anions is used. Where more than one anion type is present in the mixture, the concentration values above may be selected independently for each anion.

In some embodiments, the anions are suspended in the solvent with anionic concentrations above the saturation limit of the solvent.

In embodiments, the electrolyte may be recycled. This is especially the case for embodiments wherein the anions are not substantially decomposed during the electrochemical process, such as when organic anions are used, e.g. when citrate and/or acetate are used.

Hydrogen Ion Concentration (i.e. [H$^+$] Concentration)

Unless stated otherwise herein, the electrolyte may be provided with any suitable hydrogen ion concentration (i.e. "[H+]") and indeed may be substantially, or completely devoid of hydrogen ions, i.e. wherein [H$^+$]=0. Preferably, in the above aspects and embodiments, the hydrogen ion concentration (i.e. "[H+]") in the electrolyte is $<1\times10^{-1}$ mol dm$^{-3}$ (such as is required in the third aspect an embodiments above). This hydrogen ion concentration would in solution (e.g. aqueous solution) correspond to a pH of >1. Thus, in the aspects and embodiments above, hydrogen ion concentration in the electrolyte may be $<1\times10^{-2}$ mol dm$^{-3}$ (i.e. corresponding to >pH 2 in solution), and preferably $<1\times10^{-3}$ mol dm$^{-3}$, for example, $<1\times10^{-4}$ mol dm$^{-3}$ or $<1\times10^{-5}$ mol dm$^{-3}$. As mentioned above, the inventors have observed that, contrary to conventional understanding, systems that do not use a strongly acidic environment can lead to an improved process of producing graphene oxide electrochemically by providing a less corrosive anode environment thus leading to a more homogeneous exfoliation of the anode and resultantly improved yields, oxidation levels and thickness.

Where hydrogen ions are present in the electrolyte, the hydrogen ion concentration may decrease during the course of the electrochemical process, such as a result of removal of protons from the electrochemical system in the form of hydrogen gas. Preferably, the hydrogen ion concentration is no less than $1\times10^{-10}$ mol dm$^{-3}$ (i.e. corresponding to a pH of no more than pH 10 in aqueous solution). Thus in embodiments, the hydrogen ion concentration is no less than $1\times10^{-9}$ mol dm$^{-3}$, $1\times10^{-8}$ mol dm$^{-3}$, $1\times10^{-7}$ mol dm$^{-3}$, $1\times10^{-6}$ mol dm$^{-3}$, $1\times10^{-5}$ mol dm$^{-3}$, or $1\times10^{4}$ mol dm$^{-3}$. In embodiments the hydrogen ion concentration in the electrolyte is around $1\times10^{-7}$ mol dm$^{-3}$ (i.e. corresponding to around neutral pH in aqueous solution). Preferably, the hydrogen ion concentration in the electrolyte is maintained between $1\times10^{-2}$ mol dm$^{-3}$ and $1\times10^{-5}$ mol dm$^{-3}$, more preferably between $1\times10^{-3}$ mol dm$^{-3}$ and $1\times10^{-4}$ mol dm$^{-3}$.

pH

Where the electrolyte is anions in a solution, the hydrogen ion concentration may be defined instead by pH. Thus, unless stated otherwise herein, an electrolyte of any suitable pH may be provided. Preferably, however, in the above aspects and embodiments, the pH of the electrolyte is >1 (i.e. wherein the hydrogen ion concentration is $<1\times10^{-1}$ mol dm$^{-3}$, such as is required in the third aspect an embodiments above). Thus, in the aspects and embodiments above, the pH may be >2, and preferably >3, for example, >4 or >5. As mentioned above, the inventors have observed that contrary to conventional understanding, systems that do not use a strong acidic environment can lead to an improved process of producing graphene oxide electrochemically by providing a less corrosive anode environment thus leading to a more homogeneous exfoliation of the anode.

The pH may rise during the course of the electrochemical process, such as a result of removal of protons from the electrochemical system in the form of hydrogen gas. Preferably, the pH does not exceed 10. Thus in embodiments, the pH does not exceed 9, 8, 7, 6, 5, or 4. In embodiments neutral pH is used. Preferably, the pH is maintained between around 2-5, more preferably 3-4.

Exemplary electrolytes include solutions of sodium citrate, sodium acetate, sodium nitrite, sodium nitrate, sodium sulphate, sodium citrate+nitric acid, sodium citrate+sodium acetate, sodium citrate+sodium acetate+sodium nitrite, and sodium citrate+sodium acetate+nitric acid+sulfuric acid. For instance, preferred electrolytes include aqueous sodium citrate, aqueous sodium acetate, aqueous sodium nitrite, aqueous sodium nitrate, aqueous sodium sulphate, aqueous sodium citrate+nitric acid, aqueous sodium citrate+sodium acetate, aqueous sodium citrate+sodium acetate+sodium nitrite, and aqueous sodium citrate+sodium acetate+nitric acid+sulfuric acid. For instance, more preferred electrolytes include 0.2 M sodium citrate, 0.2 M sodium acetate, 0.2 M sodium nitrite, 0.2 M sodium nitrate, 0.2 M sodium sulphate, 0.2 M of sodium citrate+0.2 M of nitric acid, 0.2 M of sodium citrate+0.2 M of sodium acetate, 0.2 M of sodium citrate+0.2 M of sodium acetate+0.1 M sodium nitrite, and 0.2 M of sodium citrate+0.2 M of sodium acetate+0.1 M nitric acid+0.1 M of sulfuric acid. More preferred electrolyte solutions are solutions of sodium citrate, sodium acetate, sodium citrate+nitric acid, sodium citrate+sodium acetate, sodium citrate+sodium acetate+sodium nitrite, and sodium citrate+sodium acetate+nitric acid+sulfuric acid, more preferably solutions of sodium citrate and/or sodium acetate.

Cell Potential and Current Density

The working potential of the cell will be at least that of the standard potential for intercalation. An overpotential may be used in order to increase the reaction rate and to drive the anions into the galleries of the graphite at the positive electrode.

An overpotential of 1 mV to 50 V may for instance be used against a suitable reference as known by those skilled in the art, suitably 1 mV to 40 V may be used, such as 1 mV to 30 V, 1 mV to 20 V, 1 mV to 15 V, or 1 mV to 12 V, more typically 1 mV to 10 V and more typically 1 mV to 5 V and even more preferably less than 5 V. In cells with only two terminals, and no reference, a larger potential may be applied across the electrodes but a significant amount of the potential drop will occur over the cell resistance, rather than act as an overpotential at the electrodes. In these cases the potential applied may be up to 20V or 30V. Typically however an overpotential is not used—in order to minimise the speed and extent of intercalation (thus reducing premature separation of non-oxidised non-exfoliation electrode pieces as discussed above).

Naturally, even when the potential applied to the positive electrode is positive, the potential difference ($\Delta V$) across the positive and negative electrodes will still be such that anodic processes occur at the positive graphitic electrode. This means that in practice if the negative electrode is at a negative potential, the positive electrode will be at a less negative potential or at zero or a positive potential.

Typically, current is allowed to pass between the electrodes at a potential difference of from 1 to 10 V, such as from 2 to 8 V, for example 2 to 5 V, e.g. 3 to 5 V, preferably less than 5 V. For instance, the current allowed to pass between the electrodes may be at a potential difference of about 1 V, about 2 V, about 3 V, about 4 V, about 5 V, about 6 V, about 7 V, about 8 V, about 9 V or about 10 V. Typically, the current is allowed to pass between the electrodes at a potential difference of less than 5V, such as at about 3 V. For instance, in embodiments, the bias voltage applied is less than 5 V.

Cycling of Potential

The voltage applied across the electrodes may be cycled or swept. That is, the potential can be varied so as to increase or decrease it. For example, the potential is changed in a first direction (it increases or decreases) for a first period and then is changed in a second direction opposite to the first direction for a second period. Thus, if the potential is increased for a first period, it can be decreased for a second period. The first and second periods can be the same or different. Preferably they are the same. The magnitude of the change (increase or decrease) can be the same or different. Preferably it is the same. The rate of change in each period can be the same or different. Preferably it is the same. Suitably the steps of changing in a first period and changing in a second period are repeated, preferably at least 2 times, more preferably at least 5 times, more preferably at least 10 times, more preferably at least 30 times. For each repeated cycle the direction, magnitude and rate of change and the duration of the first and second periods can be selected independently. Preferably they are the same.

Thus, embodiments include a cyclical variation of the potential.

In embodiments the variation of potential includes swapping/switching the polarity of the electrodes such that the negative electrode becomes the positive electrode and vice versa. This means that the anodic process on the positive electrode will stop during the part of the method in which the polarity is reversed.

Suitably the switching of polarity is cyclical such that it is repeated, preferably at least 2 times, more preferably at least 5 times, more preferably at least 10 times, more preferably at least 30 times.

In embodiments the switching interval is in the range 10 seconds to 1 hour, suitably 10 seconds to 30 minutes, suitably 10 seconds to 20 minutes, suitably 10 seconds to 15 minutes, suitably 10 seconds to 10 minutes, suitably 30 seconds to 10 minutes, suitably 30 seconds to 5 minutes, such as 30 seconds to 3 minutes.

The switching interval may in embodiments be kept constant (e.g. switching occurs every X minutes for the period during which potential switching occurs).

Suitably the period after a potential switch (i.e. between a first switch and a second switch) is at least 10 minutes, suitably at least 20 minutes, suitable at least 30 minutes, suitably at least 40 minutes, suitably at least 50 minutes, suitably at least 60 minutes, suitably at least 90 minutes, suitably at least 120 minutes.

The present inventors have observed that the use of voltage switching in the context of the specific type of electrolyte described herein can lead to improved formation and/or isolation of graphene oxide and related materials. This is believed to be because intercalated ions are urged out of the galleries of the graphite as a result of the reversal of the potential and this in turn can cause flexing of the graphitic layers and hence encourage separation of the layers in a more homogenous manner.

In embodiments, alternating current can be used to allow both intercalations and de-intercalations.

In particularly preferred embodiments both the electrodes are graphitic and the potential is varied so that electrodes change from positive to negative and vice versa. In this embodiment the anionic exfoliation would occur at both electrodes, depending on the polarity of the electrode during the voltage cycle.

The current density at the positive electrode will be controlled through a combination of the electrode's surface area and overpotential used. The method can also be carried out under current control.

Current

The reaction may be performed under current rather than voltage control. The absolute current value will vary depending on the electrolyte resistance, size of electrodes and temperature, etc. and current may thus be varied by the skilled person depending on the reaction conditions.

The current density may be at least 1 microA per $cm^2$, such as at least 10 microA per $cm^2$, or at least 100 microA per $cm^2$, suitably 1, 2, 3, 4, 5, 6, 7, 8, 9 or 10 A per $cm^2$. Typically the current density is less than 15 A per $cm^2$, suitably less than 12 A per $cm^2$, or less than 10, 9, 8, 7, 6, 5, 4, 3 or 2 A per $cm^2$. Typically, the current density is in the range of 1 microA per $cm^2$ and 10 A per $cm^2$. Preferably the current density is in the region of 300 mA per $cm^2$.

Operating Temperature

The cell is operated at a temperature which allows for production of the desired material. The optimum operating temperature will vary with the nature of the electrolyte. For instance, operating the cell near to the melting point and up to the boiling point of the electrolyte may be carried out in the present invention.

The temperature within the electrochemical cell may in embodiments be at least −80° C., −70° C., −60° C., −50° C., −40° C., −30° C., −20° C., or −10° C., for instance at least zero, or at least 10° C., preferably at least 20° C. For instance, the temperature within the electrochemical cell may be room temperature. In some embodiments, the temperature within the electrochemical cell is at least 30° C., 40° C., 50° C., 60° C., 70° C., 80° C., 90° C. or 100° C., e.g. at least 30, 40 or 50° C. More preferably the temperature within the cell does not exceed 120° C., 110° C., 100° C., 90° C., 80° C., 70° C., 60° C. or more preferably 50° C. Typically the temperature referred to above is the electrolyte temperature.

Operating Pressure

The electrochemical cell may be operated at any suitable pressure that allows for production of the desired graphene oxide/graphite oxide nanoplatelet structures.

Operating Atmosphere

The electrochemical cell may be operated under any suitable gaseous atmosphere. In preferred embodiments, the electrochemical cell is operated under air.

Duration of Reaction

The electrochemical process may be operated for a length of time adequate to provide a desirable yield of graphene oxide and/or the graphite oxide nanoplatelet structures, a desirable level of oxidation and or thickness of graphene oxide. The duration of the process typically refers to the length of time that a current is passed between the electrodes in the presence of the intercalating anions prior to isolation of the graphene/graphite nanoplatelet structures. The current may be passed between the electrodes continuously or intermittently, typically continuously.

In some embodiments, the length of time that a current is passed between the electrodes is greater than one minute, preferably greater than 5 min, 10 min, 20 min, 30 min, 40 min, 50 min preferably greater than one hour. Typically, the reaction duration from 1 h to 72 h, such as from 1 h to 48 h, for instance 1 h to 24 h. In further embodiments, the length of time that a current is passed between the electrodes is from 1 h to 10 h, 1 h to 5 h or 1 h to 4 h. Typically the length of time that a current is passed between the electrodes is about 5 h. In alternative embodiments, the reaction is continuous.

Recovery of Anions

In one embodiment, the anions used for the exfoliation are recovered after exfoliation. The anions may be recovered by washing and/or heating of the exfoliated material, electrochemical reduction of the anions, ultrasonic energy treatment of the exfoliated material, displacement from the exfoliated material by surfactants or combinations thereof. Typically, the anions are recovered by washing.

Further Method Steps

In one embodiment, organic ions may be used to favour the exfoliation of graphite through a process of polymerization and expansion between the graphene layers. Suitable organic ions include monomers for polymerisation possessing electron-withdrawing groups such as nitrile, carboxyl, phenyl, and vinyl.

The graphene oxide or graphite oxide nanoplatelet structures having a thickness of less than 100 nm produced by the methods of the present disclosure may be separated from the electrolyte by a number of separation techniques, including:
(a) filtering;
(b) using centrifugal forces to precipitate the graphene or graphite nanoplatelet structures;
(c) collecting the graphene oxide or graphite oxide nanoplatelet structures at the interface of two immiscible solvents; and
(d) sedimentation.

The methods of the invention may include the further step of manipulating the graphene oxide/graphite oxide nanoplatelet structures either prior to isolation (such as in the electrochemical cell), or after isolation from the electrochemical cell. The electrochemically exfoliated graphene oxide or graphite oxide nanoplatelet structures may be further treated after exfoliation. For example, the materials may be further exfoliated using ultrasonic energy and other techniques known to those skilled in the art to decrease the flake size and number of graphene oxide layers. Exfoliation by sonication for instance may be performed after the electrochemical reaction has completed and/or during the electrochemical reaction. Furthermore, the graphene oxide and graphite oxide nanoplatelet flakes obtained may additionally or alternatively be subject to a further oxidation step either in the electrochemical cell or in a second reaction vessel, such as by using a further electrochemical oxidation step or by using conventional chemical processes of oxidising graphene/graphite/graphene oxide/graphite oxide. For instance, the prior art methods described in the background section (e.g. Hummers' method) may be used. Typically, further oxidation of the graphene is not performed.

In some embodiments, the electrochemical intercalation may be repeated in order to achieve full exfoliation and/or more oxidation.

As discussed above, the graphite at the positive electrode may be treated chemically, electrochemically and/or mechanically prior to its exfoliation, for example the graphite may be chemical functionalised, by electrochemical exfoliation and/or by oxidation in nitric acid and/or by fluorination using hydrofluoric acid. The graphite anode may also be mechanically treated by ball-milling. Typically, the positive graphitic electrode is not subject to pre-intercalation prior to use in the electrochemical step of the present methods. Suitably, the positive electrode is not chemically pre-treated, more preferably is not pre-treated at all. For instance, natural graphite may be used. In embodiments, the graphite anode is not pre-treated mechanically prior to use in the electrochemical step of the present methods, for instance, in embodiments the graphite anode is not pre-treated by ball-milling prior to use in the electrochemical step of the present methods.

The graphene oxide/graphite oxide nanoplatelet structures may be washed to remove contaminants prior to or following isolation, for instance to remove residual electrolyte from the product surface. In embodiments, the process includes the step of forming and/or shaping the graphene oxide/graphite oxide nanoplatelet structures prior to, or following, isolation, such as forming and/or shaping the graphene oxide into an article. In embodiments, the method includes the step of incorporating the graphene and or graphite nanoplatelet structures into an article.

In embodiments, the methods of the aspects and embodiments above include the step of adding said anions to a solvent to form an electrolyte solution.

The invention also provides graphene oxide as described in any aspect or embodiment herein. In embodiments, the graphene oxide is as prepared according to any method of any previous aspect and embodiment herein. In embodiments, the graphene oxide is as characterised according to any one of the figures.

BRIEF DESCRIPTION OF THE DRAWINGS

FIG. 6 shows the respective TEM and SEM images of material isolated at various stages of the electrochemical process of Example 1.

EXAMPLES

The following examples are intended to exemplify the methods of the invention. Variations and modifications of the methods provided below whilst remaining within the scope of the invention as defined in the claims will be apparent to the skilled person.

General Conditions

For all experiments, a sample of natural graphite (typically having a particle size of 25 microns unless indicated otherwise below) was connected to the anode and platinum wire served as the cathode. The electrochemical experiments were conducted at 300 mA constant current (typically at a potential difference between the electrodes of less than 5 V) for 5 hours using PSS-210-GW INSTEK programmable power supply equipped with Instek PSU software. After the electrolysis, the remaining product (black carbonaceous powder) was collected from the electrochemical cell by filtration and then washed first with dilute HCl, then with water and then dried overnight under vacuum. The powder was then suspended in water by sonication for 30 minutes, and then centrifuged at 5000 rpm for 30 minutes. The isolated precipitates were then dried and weighed in order to calculate the process yield.

Characterisation of GO

Raman spectra were obtained using a Renishaw system 1000 spectrometer coupled to a He—Ne laser (633 nm). The laser spot size was ~1-2 μm, and the power was about 1 mW when the laser is focused on the sample using an Olympus BH-1 microscope. The SEM images were taken using a Zeiss Leo 1530 FEGSEM. TEM analysis was conducted using FEI Tecnai FZO 200 kv FEGTEM.

Figure 5A:
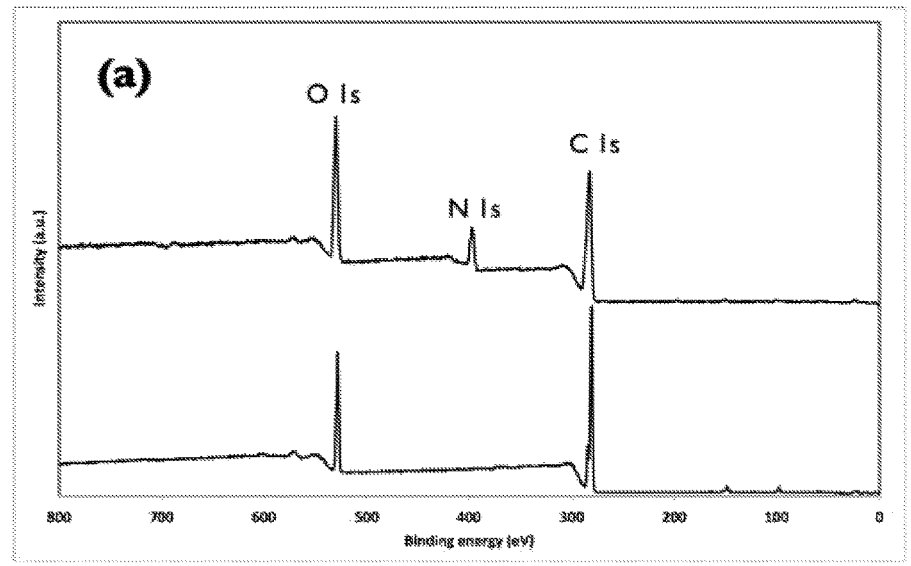
FIG. 5a shows the XPS spectra for the GO in Example 1 (bottom) and when nitric acid was added to the electrolyte (top—corresponding to Example 8)
Figure 5B:
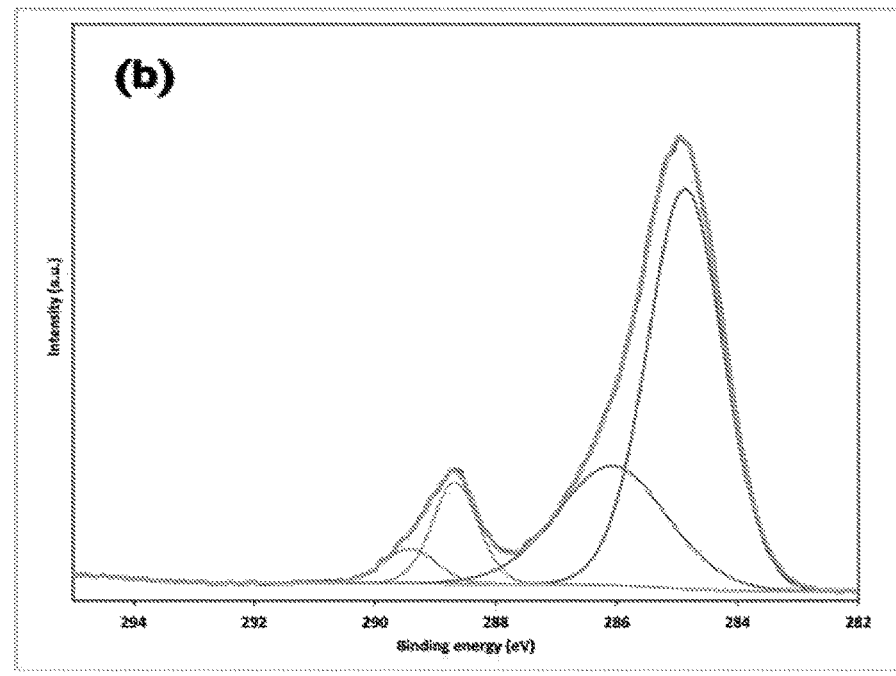
FIG. 5b shows the high resolution XPS of the C1s spectra of the GO from Example 1 showing deconvoluted peaks for various oxygenated functionalities.
Figure 5C:
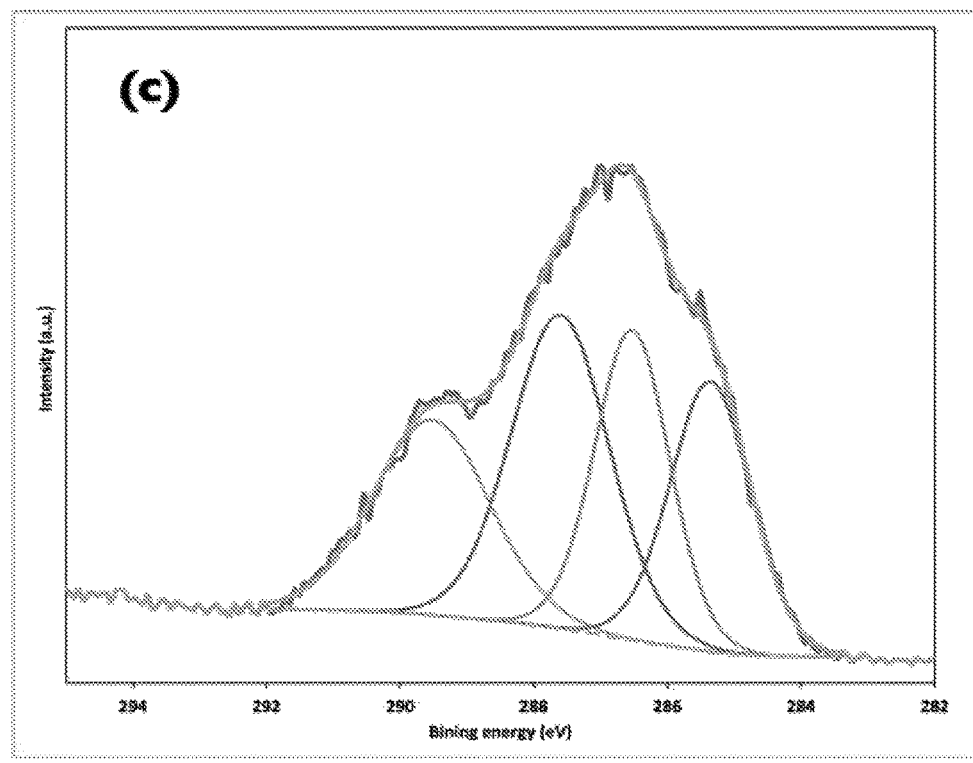
FIG. 5c shows the high resolution XPS of the C1s spectra of GO as produced in Example 8, i.e. after adding $HNO_3$ showing deconvoluted peaks for various oxygenated functionalities.

The measured Raman spectrum (see an example in FIG. 5a) has intense 2D bands at 2645 and 2669 $cm^{-1}$, with average FWHM=67 $cm^{-1}$. The 2D/G ratio is 0.75 to 0.9. The intensity of the G band is significantly higher than that of the D band, suggesting that the graphene has a low intensity of defects. TEM images are shown in FIGS. 5b, 5c, and 5d. As seen in the SEM images (FIGS. 5e, 5f and 5g), the size of the graphene sheets produced ranged from 2 μm to 10 μm.

Graphene oxide was characterised by X-ray diffraction (XRD), Raman analysis, atomic force microscopy (AFM), scanning electron microscopy (SEM), transmission electron microscopy (TEM) and thermogravimetric analysis (TGA).

Samples for Raman spectra the Atomic force microscope (AFM), and SEM analysis were obtained by a simple drop casting method. The suspension resulting from the electrochemical process was diluted in distilled water with 1:20 suspension to water volume ratio and then poured on 300 nm thick $SiO_2$ covered on Si wafers. The layers were subsequently dried at a controlled temperature of 80° C.

The sample for the TEM analysis was deposited from the diluted suspension on TEM grids and dried overnight at 80° C. Raman spectra were obtained using a Renishaw system 1000 spectrometer coupled to a He—Ne laser. The laser spot size was ~1-2 μm, and the power was about 1 mW when the laser is focused on the sample using an Olympus BH-1 microscope.

Atomic force microscope (AFM) images were obtained using a Multimode Nanoscope V scanning probe microscopy (SPM) system (Veeco, USA) with Picoscan v5.3.3 software. Tapping mode was used to obtain the images under ambient conditions. The morphology of the graphite and GO were also observed by SEM using a Carl Zeiss SUPRA SMT AG scanning electron microscope (LE01525, Carl Zeiss, Oberkochen, Germany) with the accelerating voltage at 5 kV. The TEM analysis used a FEI Tecnai F20 microscope.

Samples for the XRD and thermogravimetric analysis (TGA) were obtained by filtration of the suspension using Anodisc® alumina membranes with 100 nm pore size. The XRD analysis was conducted using a Philips X'PERT APD powder X-ray diffractometer (λ=1.54 A, CuKα radiation). TGA was performed in air and under argon atmosphere were carried out using a Jupiter Netzsch STA 449 C instrument. The sample was placed into alumina crucible and heated with a rate of 10° C./min from 30° C. up to 800° C. To avoid thermal expansion of the GO due to rapid heating, APD samples were also heated from 50° C. to 500° C. at 1° C./min. X-ray photoelectron spectroscopy (XPS) was used to monitor the composition of the exfoliated products after electro-oxidation and multiple washing. An exemplary XPS survey scan is shown in FIG. 5.

Example 1

The experiment was run as described in the general methods section above. A 0.2 M buffer solution of sodium citrate was used as an electrolyte. About 0.11 gram was collected. XPS measurements showed that the oxygen content was 13.15% wt. and the yield of the process was 86%.

Figure 1:
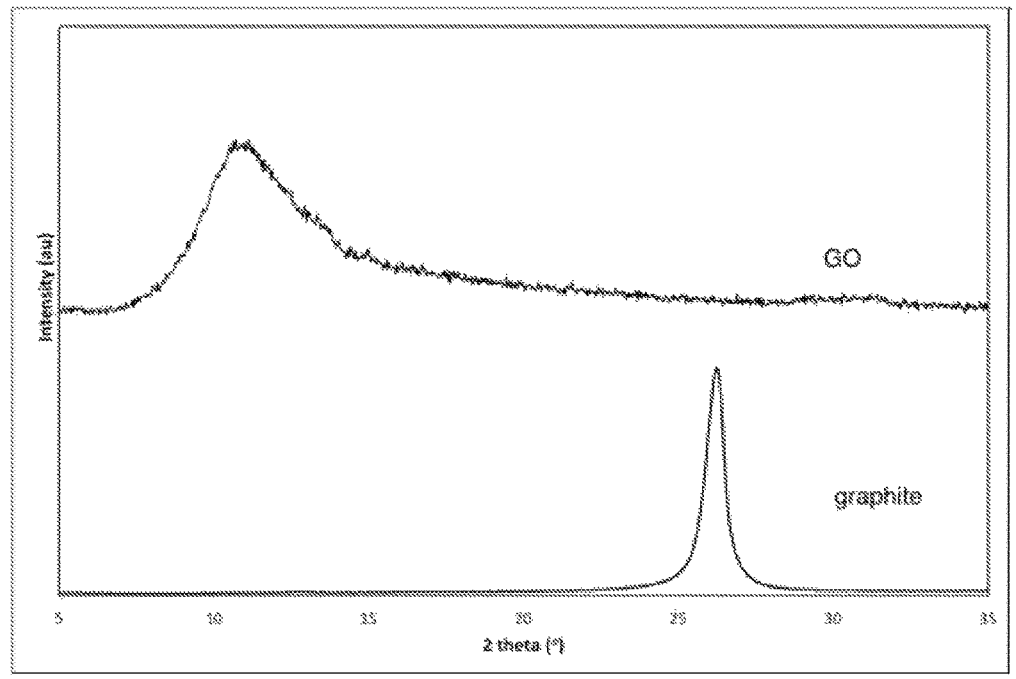
FIG. 1 shows the X-ray diffraction (XRD) patterns of the parent graphite (bottom) and electrochemically exfoliated GO (top) corresponding to Example 1.

FIG. 1 shows the X-ray diffraction (XRD) patterns of the parent graphite and electrochemically exfoliated GO. The graphite exhibited a single well-defined peak at 2θ=26.59°, which corresponds to the (002) plane. The XRD for the GO has a distinct diffraction peak at 2θ=10.24°. The figure shows the transformation of the interlayer spacing (d002 spacing) from 0.335 to 0.822 nm, which is a clear indication of the complete transformation from graphite to GO. The distance between consecutive carbon layers was increased for GO due to the introduction of oxide functional groups to the carbon basal plane via the electrochemical oxidation reaction.

Figure 2:
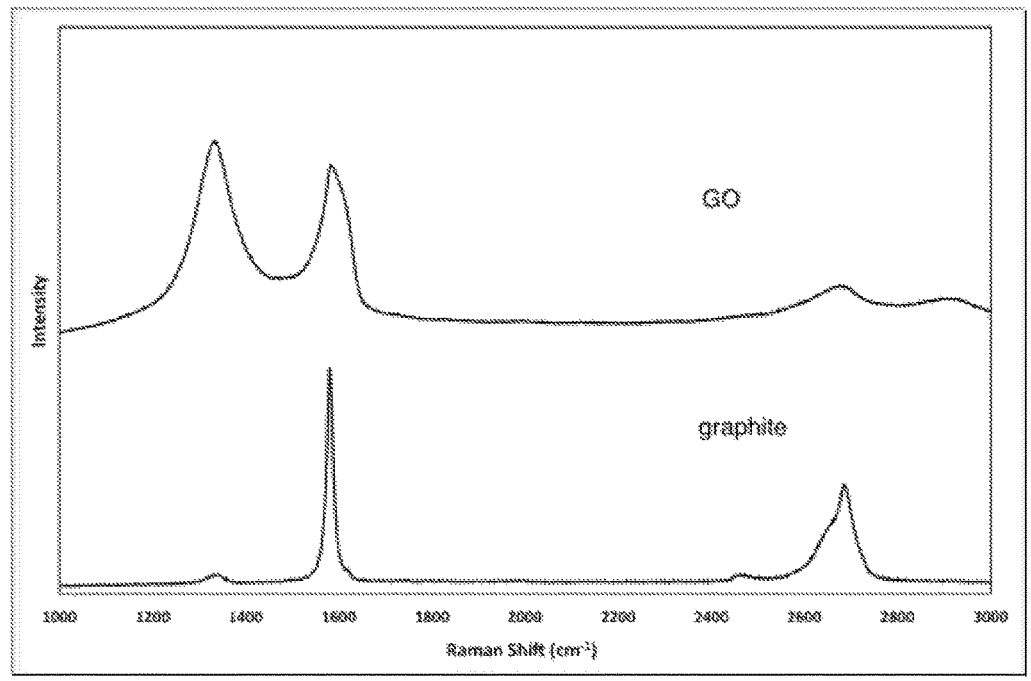
FIG. 2 shows the Raman data for electrochemically exfoliated GO (top) and the starting graphite material (bottom) corresponding to Example 1.

Typical Raman data for the electrochemically exfoliated GO and the starting graphite are shown in figure is in FIG. 2, which clearly shows in the exfoliated product G peaks ~1590 cm-1, a high intensity D band (~1330 $cm^{-1}$) and the disappearance of the 2D band (~2670 $cm^{-1}$) relative to the graphite starting material. The broadening and the shift of G line to higher frequency and the appearance of broad D line point to intense formation of structural defects and dramatic break-up of the original graphite domains, which is in a good agreement with the crystalline changes deduced from the XRD data. The disappearance of the 2D band, which is typical for multilayer graphene structures in graphite, also confirms the lattice distortions. This high density of defects in GO is due to the large abundance of oxygenated functional groups that disrupt the planar $sp^2$ structure.

Figure 3A:
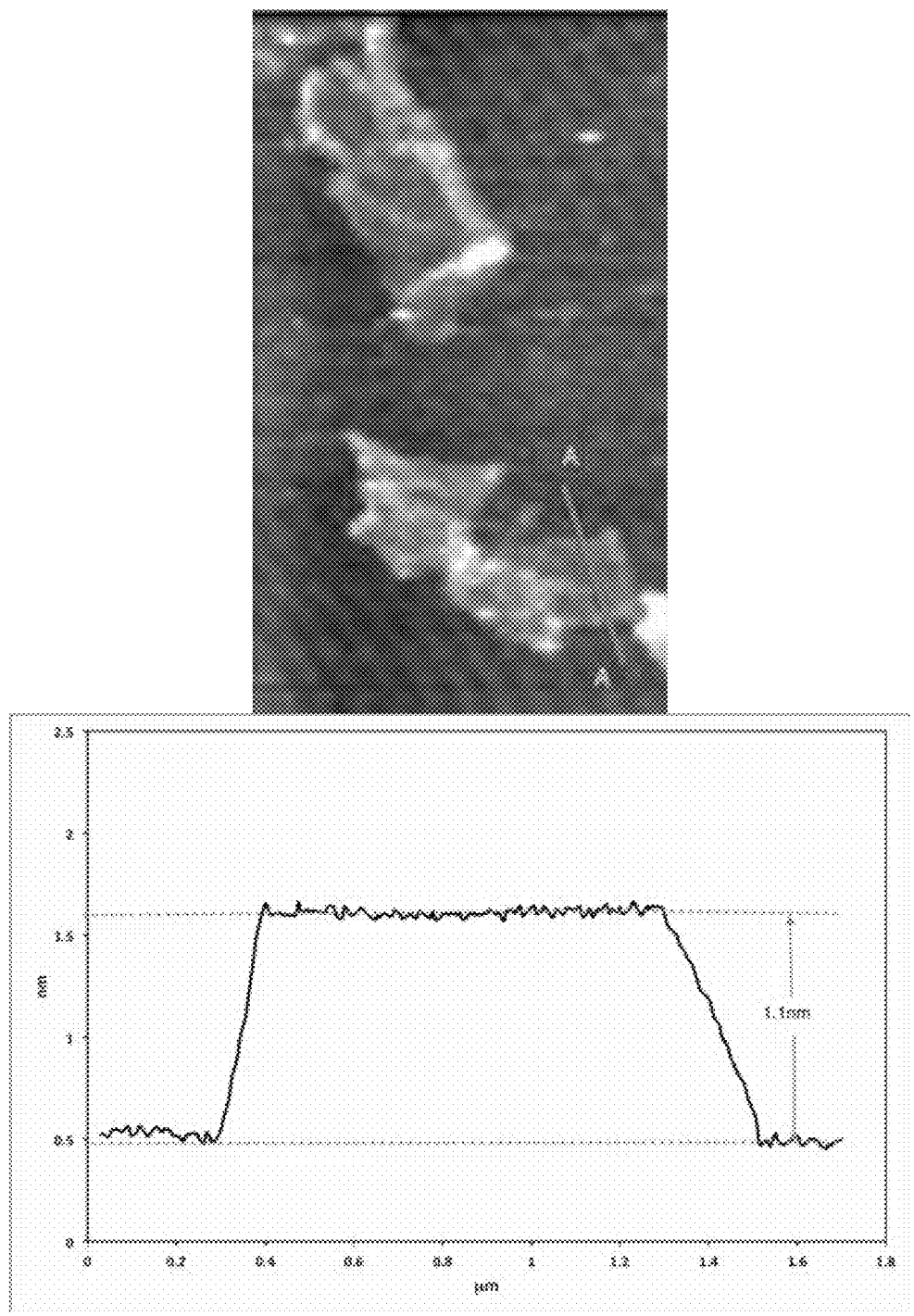
FIG. 3a shows an AFM image (top) and corresponding trace (bottom) for monolayer graphene oxide according to Example 1.
Figure 3B:
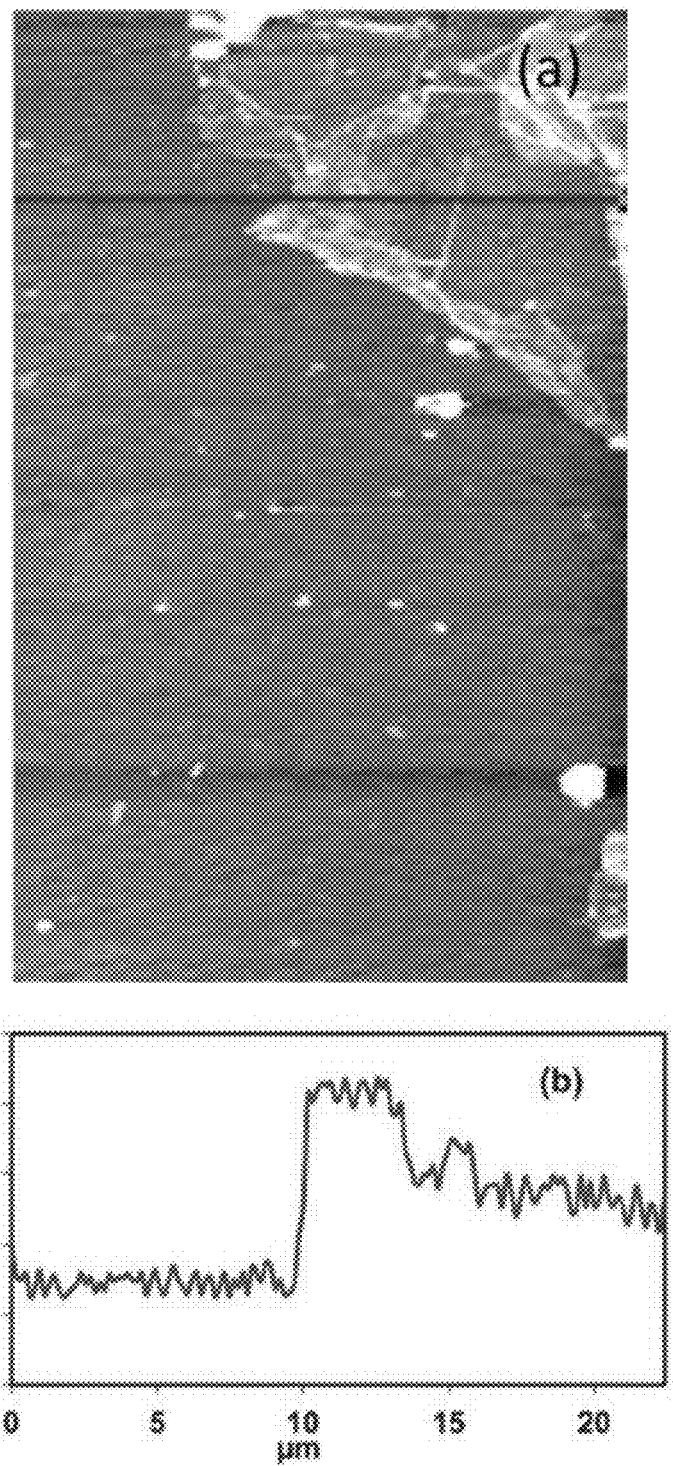
FIG. 3b shows an AFM image (top) and corresponding trace (bottom) for monolayer and bilayer graphene oxide according to Example 1.
Figure 3C:
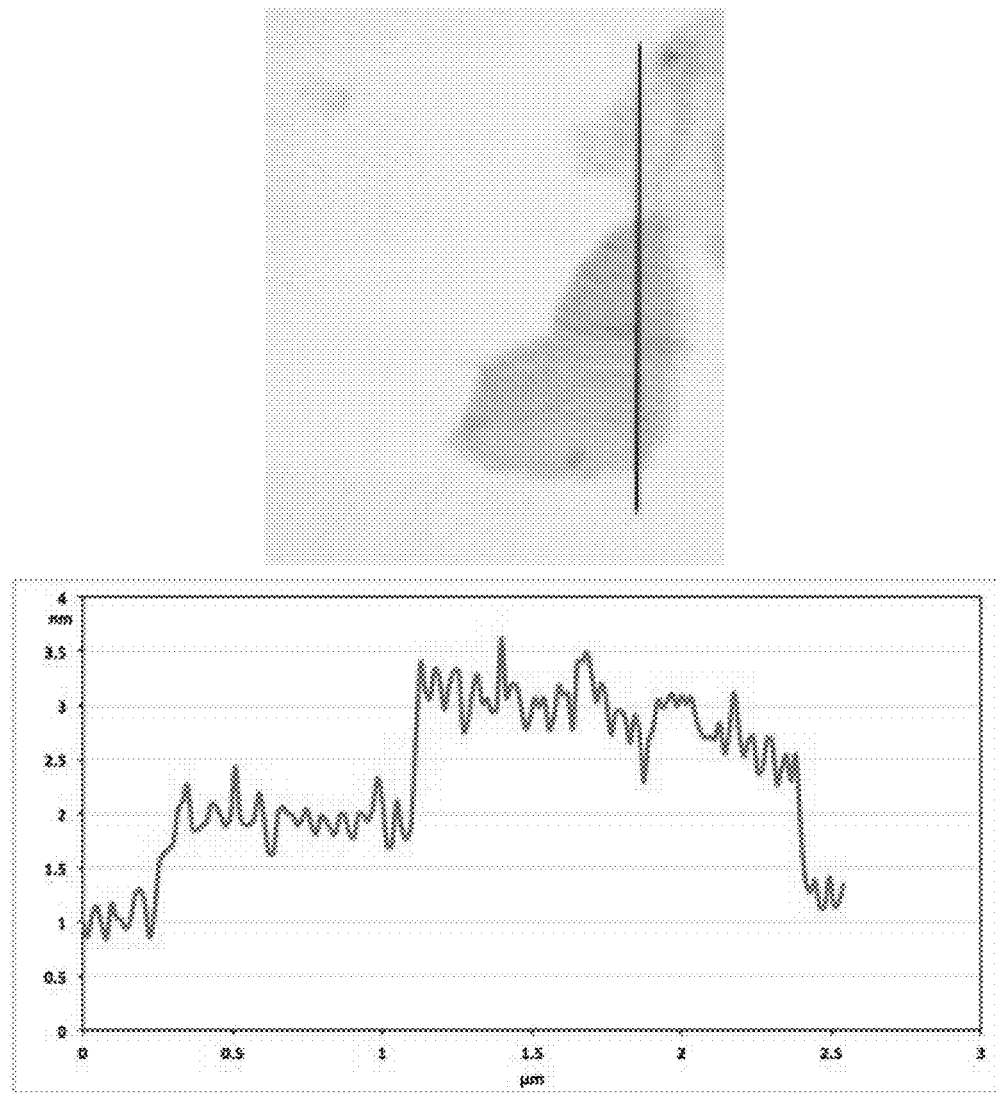
FIG. 3c shows an AFM image (top) and corresponding trace (bottom) for monolayer and bilayer graphene oxide according to Example 1.

The thickness of the exfoliated GO was examined using atomic force microscope (AFM). A pristine graphene sheet is atomically flat with a well-known thickness of 0.34 nm. GO is however expected to be thicker owing to the presence of functionalized oxygen and hydrocarbon groups attached above and below the original graphene plane. The height profile of the AFM image (FIGS. 3a, 3b, and 3c) of GO sheets obtained by the above method indicates that the thickness of the obtained GO sheet is about 1.1 nm, suggesting the successful exfoliation of graphite down to individual GO sheets was indeed achieved under the electro-oxidative conditions. The surface functional groups in the GO disrupts the original graphene conjugation and introduces lattice defects to result in folds and distortions on the sheets, which explains also the slightly thicker layers than the interlayer spaces measured by the XRD. FIG. 3a shows an AFM image for monolayer graphene oxide and FIG. 3c shows the presence of both monolayer and bilayer graphene oxide as seen in the corresponding thickness traces which from left to right corresponds to the linear path in the image from top to bottom plotting thickness in nm against length in μm. This confirms the ~1 nm thickness of the graphene oxide layers. These data also indicate that graphene oxide flakes of greater than 1 μm in length are obtained.

Figure 4:
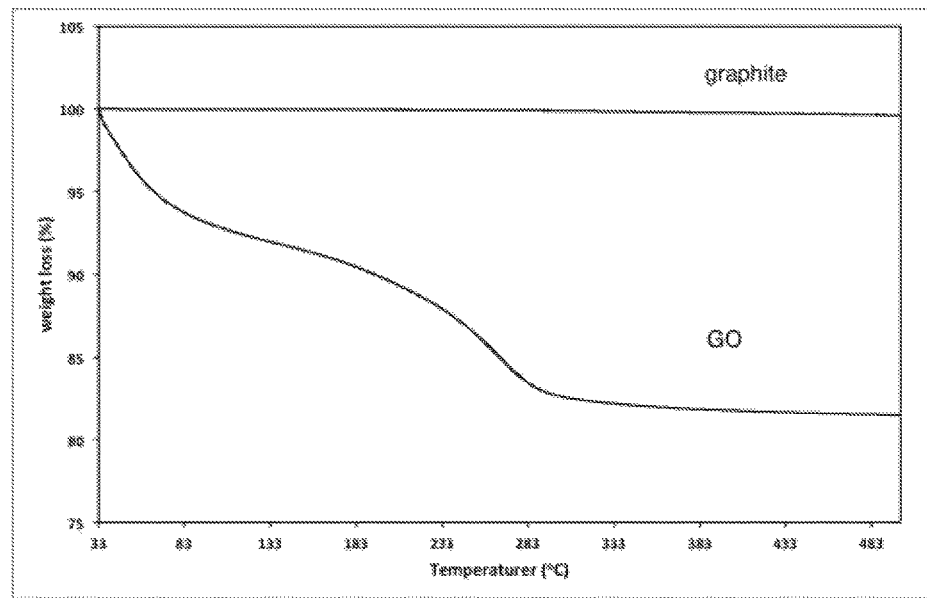
FIG. 4 displays the TGA curves for GO samples exfoliated via the electro-oxidative process (bottom) against graphite starting material (top) measured between room temperature and 800° C. in $N_2$.

FIG. 4 displays the TGA curves for GO samples exfoliated via the electro-oxidative process against graphite starting material measured between room temperature and 800° C. in $N_2$. The TGA curve exhibits two weight losses: from room temperature to 110° C. and from 275 to 400° C. The lower temperature mass loss of 5.71% is due water molecules adsorbed onto the GO bulk material, the following loss of 12.4% decrease stands for elimination of remaining functional groups, further decomposition take place up to 800° C. This curve is in agreement with the TGA curve recorded for GO produced by the Hummer process in terms of the temperature for the changes and mass losses.

X-ray photoelectron spectroscopy (XPS) was used to monitor the composition of the exfoliated products after electro-oxidation and multiple washing. As shown in the XPS survey scan in FIG. 5, the C1s band can be fitted to seven deconvoluted components (see FIGS. 5b and 5c). Components located at 284.5 and 285.0 eV can be assigned to the non-oxygenated ring carbon C—C/C—H ($sp^3$), and C=C ($sp^2$), respectively. The binding energies of components at 286.4 eV, 287.0, 288 eV and 289 would be consistent with C—OH (hydroxyl), epoxy, carbonyl and carboxyl/ester respectively. These results showed clearly that the electro-oxidative process has introduced oxygenated functional groups into the graphene surface. The carbon/oxygen ratio was 7.6, indicating that a desirable level of oxygenation has been achieved, but which lower than that obtained for example by the Hummer process, which has been reported in the literature to exhibit a carbon/oxygen ration of ~2.0. Lower oxygen levels may be desirable in many applications. For example, lower oxygen-containing material may provide more attractive starting material in processes of producing graphene by reduction of graphene oxide (compared to graphene oxide produced by, say, Hummer's method).

Example 2

The reaction was conducted as above for Example 1 but the 0.2 M of aqueous sodium citrate electrolyte solution was replaced by 0.2 M aqueous sodium acetate. 0.14 gram was collected. XPS measurements showed that the oxygen content of the product was 12.4% and the yield of the process was 78%.

Example 3

Figure 7:
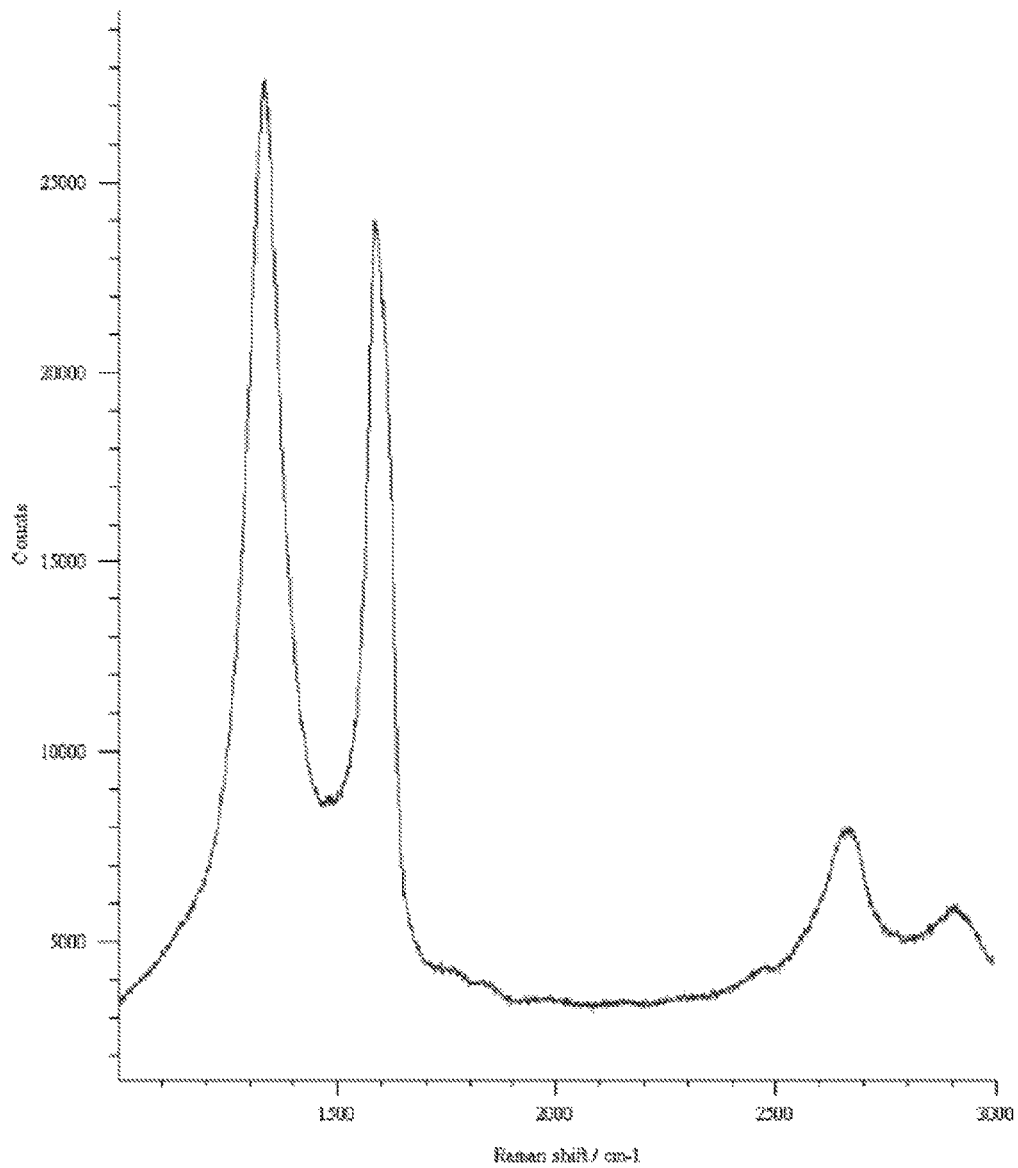
FIG. 7 shows the XRD data for the material produced in Example 3.

The reaction was conducted as above for Example 1 but wherein electrolyte solution was a mixed aqueous solution of 0.2 M of sodium citrate and 0.2 M sodium acetate.

a) when a graphite particle size of 25 microns was used, 0.15 gram was collected. XPS measurements showed that the oxygen content was 14.23% and the yield of the process was 85%. The XRD data is presented in FIG. 7; b) when a graphite particle size of 3 microns was used, 0.21 gram was collected. XPS measurements showed that the oxygen content was 16.49% and the yield of the process was 88%.

Example 4

The reaction was conducted as above for Example 1 but wherein electrolyte solution was an aqueous solution of 0.2 M of sodium nitrite. 0.58 gram was collected, corresponding to a yield of 9.6%.

Example 5

The reaction was conducted as above for Example 1 but wherein electrolyte solution was an aqueous solution of 0.2 M of sodium nitrate. 0.62 gram was collected, corresponding to a yield of 12.7%.

Example 6

The reaction was conducted as above for Example 1 but wherein electrolyte solution was an aqueous solution of 0.2 M of sodium sulfate. 0.58 gram was collected, corresponding to a yield of 11.6%.

Example 7

Figure 9:
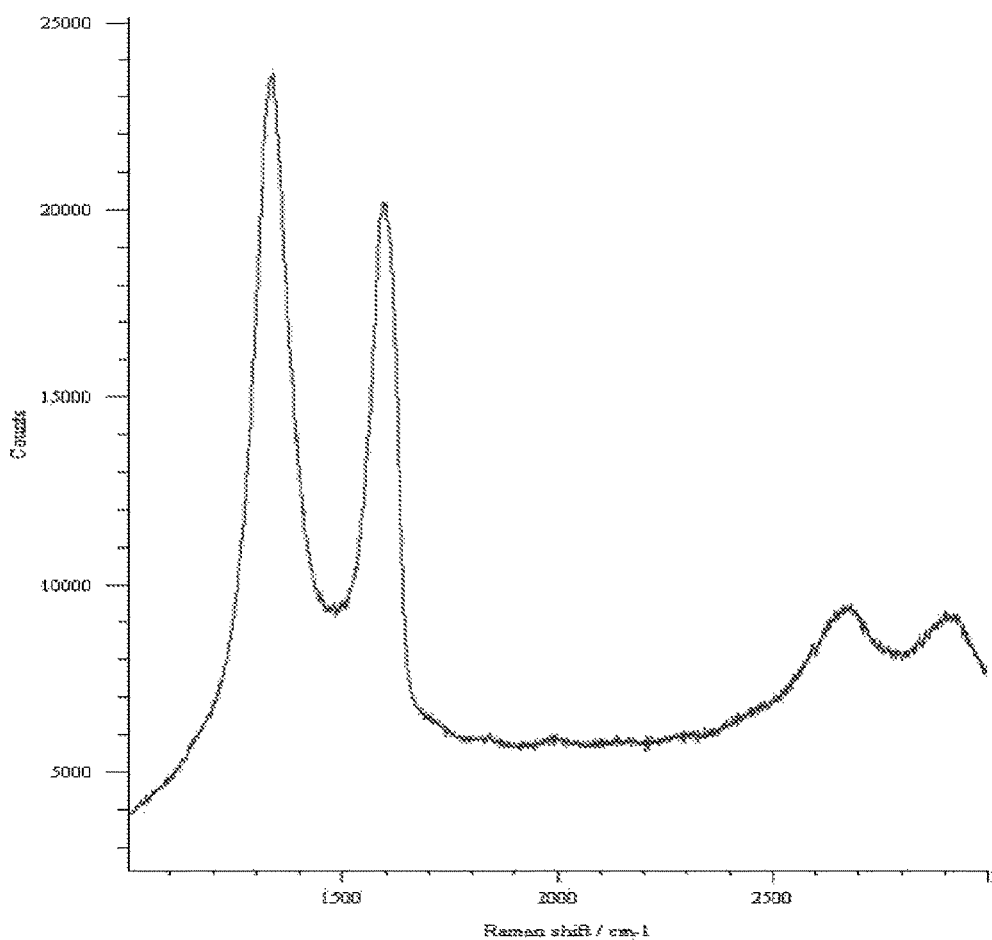
FIG. 9 shows the XRD data for the graphene oxide produced in Example 7.

Analogous conditions to example 1 were used, but wherein the electrolyte contained a combination of 0.2 M sodium citrate, 0.2 M sodium acetate and 0.1 M sodium nitrite. 0.11 g was collected. XPS measurements showed that the oxygen content was 17.89% and the yield of the process was 14%. XRD data for the graphene oxide produced is shown in FIG. 9.

Example 8

Figure 8:
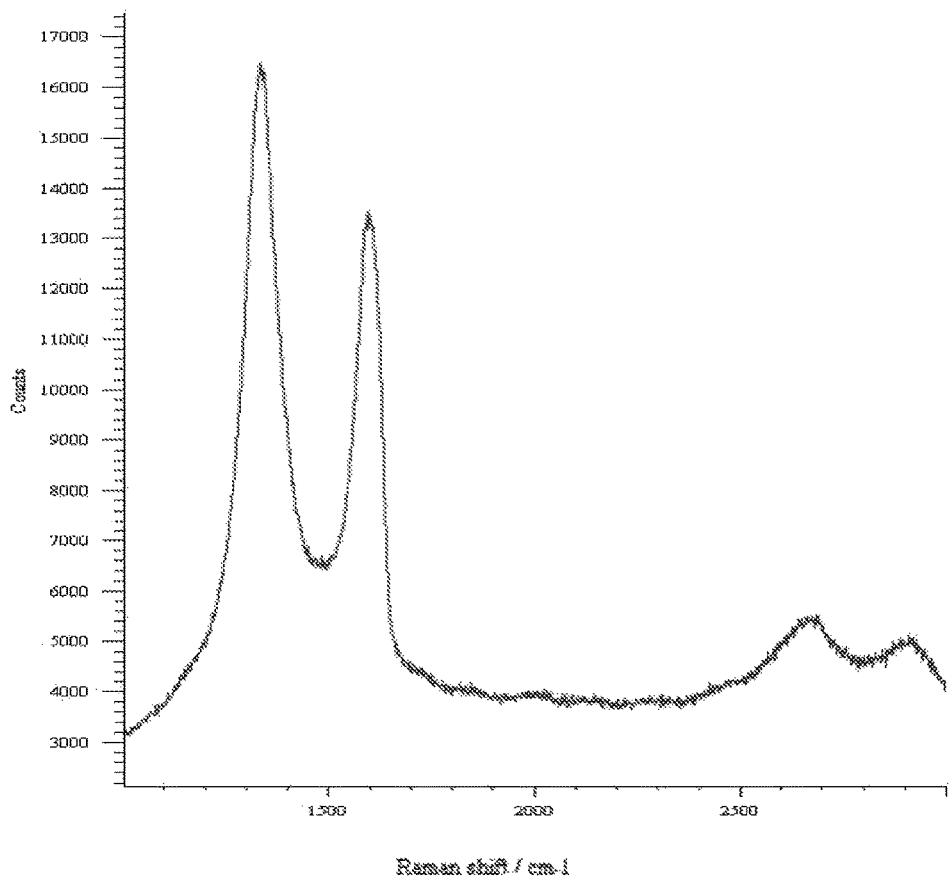
FIG. 8 shows the XRD data for the graphene oxide produced in Example 8.

Analogous conditions to example 1 were used, but wherein the electrolyte solution was a mixed aqueous electrolyte solution of 0.2 M sodium citrate and 0.2 M nitric acid. 0.08 g product was collected. XPS measurements showed that the oxygen content was 18.3% and the yield of the process was 18%. XRD data for the graphene oxide produced is shown in FIG. 8.

Example 9a

Analogous conditions to Example 7 were used, but wherein the graphitic electrode was wrapped in a muslin cloth having an average pore size of 130 micron. 3 cm of the graphite rod was covered by the muslin and only 1 cm of the covered part was immersed in the electrolyte. The required current/voltage was then applied. 0.45 g was collected. XPS measurements showed that the oxygen content was 21.23% and the yield of the process was 64%.

Example 9b

Analogous conditions to Example 9a were used, but wherein the reaction was run for 16 h. 0.79 g was collected. XPS measurements showed that the oxygen content was 32.14% and the yield of the process was 83%.

Example 10

Analogous conditions to Example 9 were used, but wherein the electrolyte was a mixed aqueous electrolyte solution of 0.2 M sodium citrate, 0.2 M sodium acetate, 0.1 M nitric acid and 0.1 M sulfuric acid and wherein a porous plastic box having a ~1 cm diameter and ~200 micron pores enclosed the immersed part of the graphitic positive electrode in place of the muslin. 0.88 g product was collected. XPS measurements showed that the oxygen content was 35.23% and the yield of the process was 87%.

Comparative Example 1

Reaction performed analogously to Example 1 but wherein the electrolyte was 0.1 M nitric acid. 0.67 g product was isolated. XPS measurements showed that the oxygen content was 18.9%. The yield was 8%.

Comparative Example 2

Reaction performed analogously to Comparative Example 1 but wherein the electrolyte was 0.1 M sulfuric acid. 0.57 g product was isolated. XPS measurements showed that the oxygen content was 19.4%. The yield was 10.2%.

TABLE 1

Summary of reaction conditions/outcomes

| Example | Electrolyte solution | Average particle size of initial graphite (micron) | Oxygen content, wt. % | Thickness of graphene oxide flakes in product, nm | Weight, g | Yield, % |
|---|---|---|---|---|---|---|
| 1 | 0.2M sodium citrate | 25 | 13.15 | 1-7 | 0.11 | 86 |
| 2 | 0.2M sodium acetate | 25 | 12.4 | 2-10 | 0.14 | 78 |
| 3a | 0.2M sodium citrate + 0.2M sodium acetate | 25 | 14.23 | 1-9 | 0.15 | 85 |
| 3b | 0.2M sodium citrate + 0.2M sodium acetate | 3 | 16.49 | 1-5 | 0.21 | 88 |
| 4 | 0.2M NaNO$_2$ | 25 | n.d. | n.d. | 0.58 g | 9.6 |
| 5 | 0.2M NaNO$_3$ | 25 | n.d. | n.d. | 0.62 g | 12.7 |
| 6 | 0.2M Na$_2$SO$_4$ | 25 | n.d. | n.d. | 0.58 g | 11.6 |
| 7 | 0.2M sodium citrate + 0.2M sodium acetate + 0.1 sodium nitrite | 25 | 17.89 | 3-20 | 0.11 | 14 |
| 8 | 0.2M sodium citrate + 0.2M nitric acid | 25 | 18.3 | 3-12 | 0.08 | 18 |

TABLE 1-continued

Summary of reaction conditions/outcomes

| Example | Electrolyte solution | Average particle size of initial graphite (micron) | Oxygen content, wt. % | Thickness of graphene oxide flakes in product, nm | Weight, g | Yield, % |
|---|---|---|---|---|---|---|
| 9a | 0.2M sodium citrate + 0.2M sodium acetate + 0.1 sodium nitrite. In muslin cloth. | 25 | 21.23 | 1-5 | 0.45 | 64 |
| 9b | 0.2M of sodium citrate + 0.2M of sodium Acetate + 0.1 sodium nitrite. In muslin cloth. | 25 | 32.14 | 1-5 | 0.79 | 83 |
| 10 | 0.2M of sodium citrate + 0.2M of sodium Acetate + 0.1 nitric acid + 0.1M of sulfuric acid. In porous plastic box. | 25 | 35.23 | 2-7 | 0.88 | 87 |
| Comparative Example 1 | 0.1M $HNO_3$ | 4 | 18.9 | n.d. | 0.67 | 8 |
| Comparative Example 2 | 0.1M $H_2SO_4$ | 4 | 19.4 | n.d. | 0.57 | 10.2 |

Summary of Results

A summary table of the respective conditions and outcomes of the experiments above are tabulated in table 1, above.

As seen in comparative examples 1 and 2, the use of nitric acid and sulfuric acid electrolyte solutions provide slightly higher levels of oxidation in the graphene oxide product, but at lower yields compared to methods of the invention.

A comparison of Examples 3a and 3b shows that decreasing the initial particle size of the graphite allows for increased oxidation, increased yield and improved exfoliation, leading to a general reduction in graphene oxide flake thickness.

Comparison of Comparative Examples 1 and 2 with Examples 5 and 6 in particular shows the improvement obtained when electrolyte pH is increased. For instance, Examples 5 and 6 show improved yields compared to comparative examples 1 and 2 respectively, despite using graphite starting material having a significantly increased particle size (as described directly above, an increase in particle size is shown to have a detrimental effect on yield).

In comparison of Example 8 and comparative example 1, an increased yield of 18% graphene oxide was obtained when a mixed aqueous solution of 0.2 M citrate and 0.2 M nitric acid was used as the electrolyte compared to ~8% yield when 0.2 M nitric acid was used alone. This significantly increased yield was achieved whilst maintaining similar oxidation levels (18.3% in Example 8 vs 18.9% in comparative example 1) and layer thickness to the nitric acid-only route. The total oxygen content thus increased compared to the sodium citrate-only example to give a C/O ratio of about 4 as can be calculated from the XPS analysis (see FIG. 5a). High-resolution scan of the C1 peak (FIGS. 5b and 5c) showed also increase in the intensity of the hydroxyl, epoxy, carbonyl and carboxyl/ester groups peaks. In addition to these groups, the survey scan detected a new peak at 400 eV corresponding to nitrogen as also shown in FIG. 5a.

This shows that the electrolytes of the present invention may be added to conventional electrolyte solutions to improve yields of graphene oxide produced without detriment to the oxidation levels in the product. For instance, in some applications, more functional groups and in general higher oxygen content is desirable. Thus, by combining acidic/oxidising electrolyte solutions with the electrolytes of the present disclosure, the conditions may be chosen to provide the high levels of oxidation usually achieved by the acidic/oxidising electrolyte solutions, but in increased yields compared to where the anions of the present disclosure are not present.

Furthermore, it is clearly evident from the results of examples 9 and 10 that the use of a porous membrane to encase the graphitic anode electrode during reaction leads to surprisingly increased levels of oxidation and yield of graphene oxide.

Figure 6A:
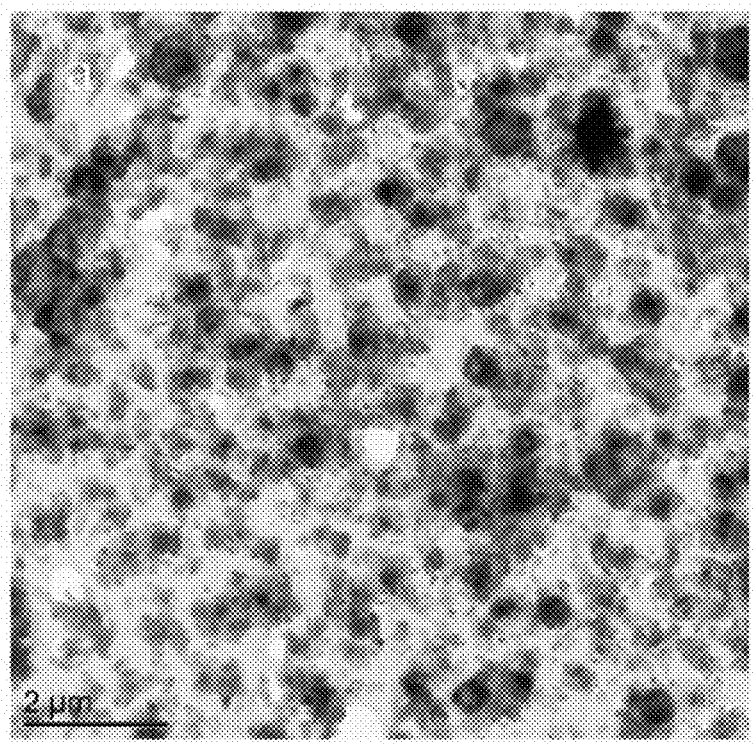
FIG. 6a shows round shape 20-100 nm particles at the first stage of the process.
Figure 6B:
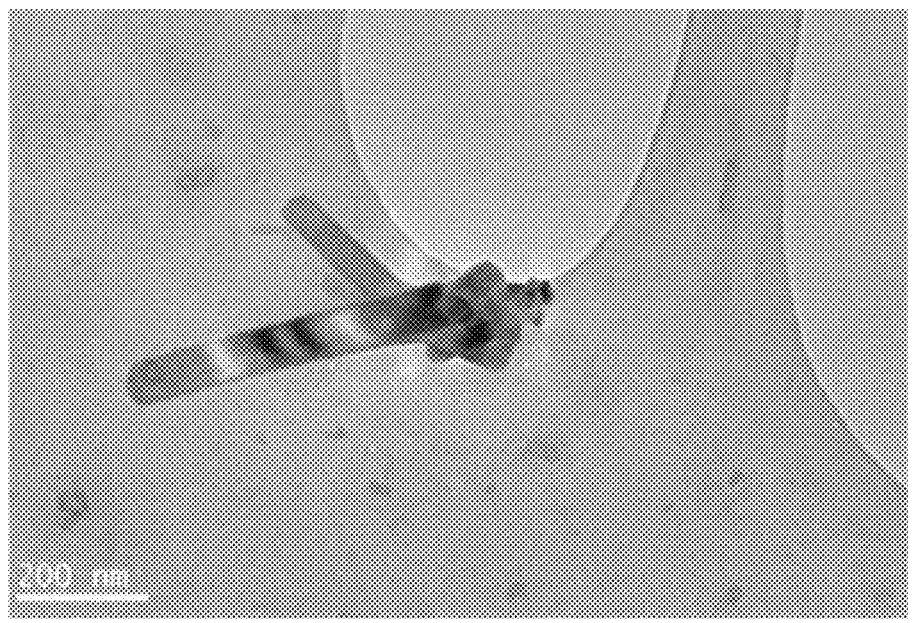
FIG. 6b shows nano-ribbons formed at an early process stage.
Figure 6C:
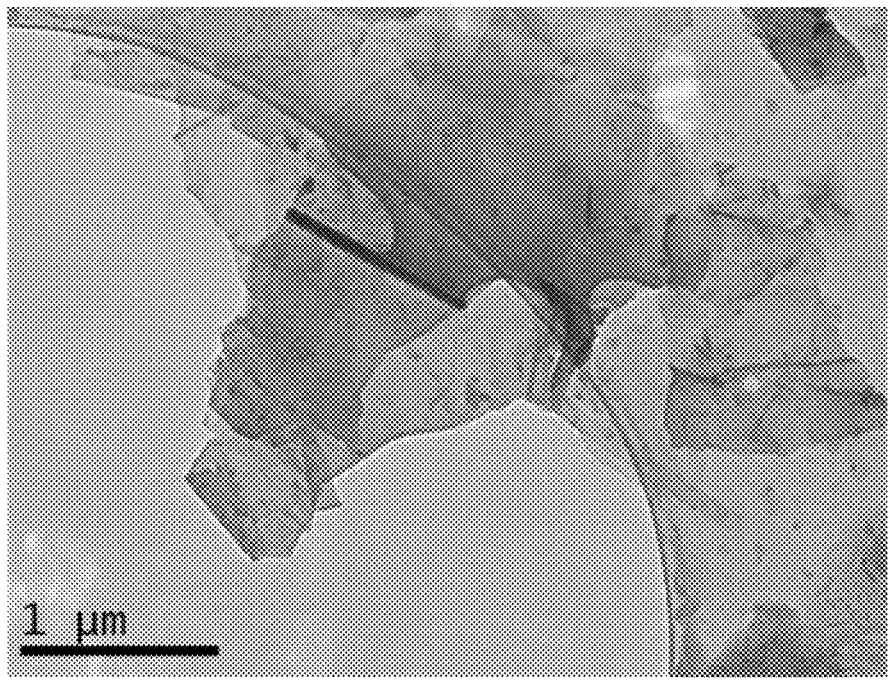
FIG. 6c shows a typical GO sheet after 5 hours of electrolysis.
Figure 6D:
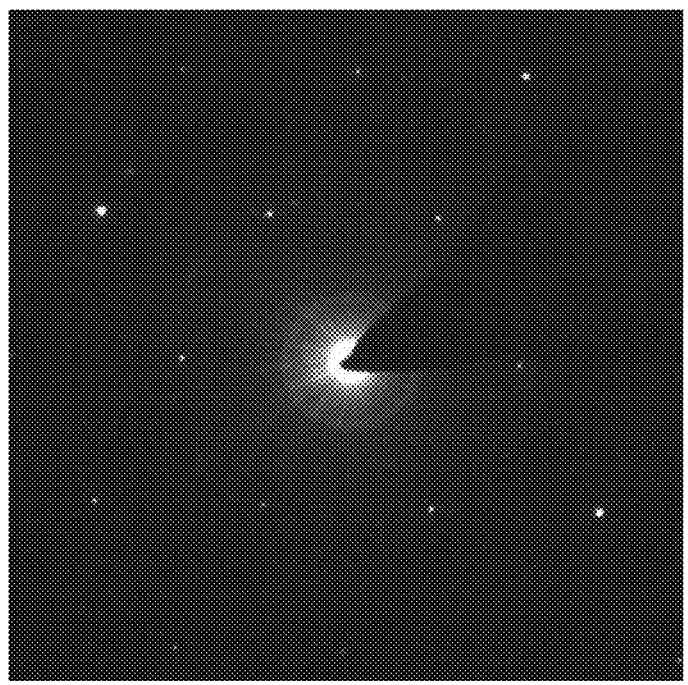
FIG. 6d shows the diffraction pattern of the typical GO sheet of FIG. 6c.
Figure 6E:
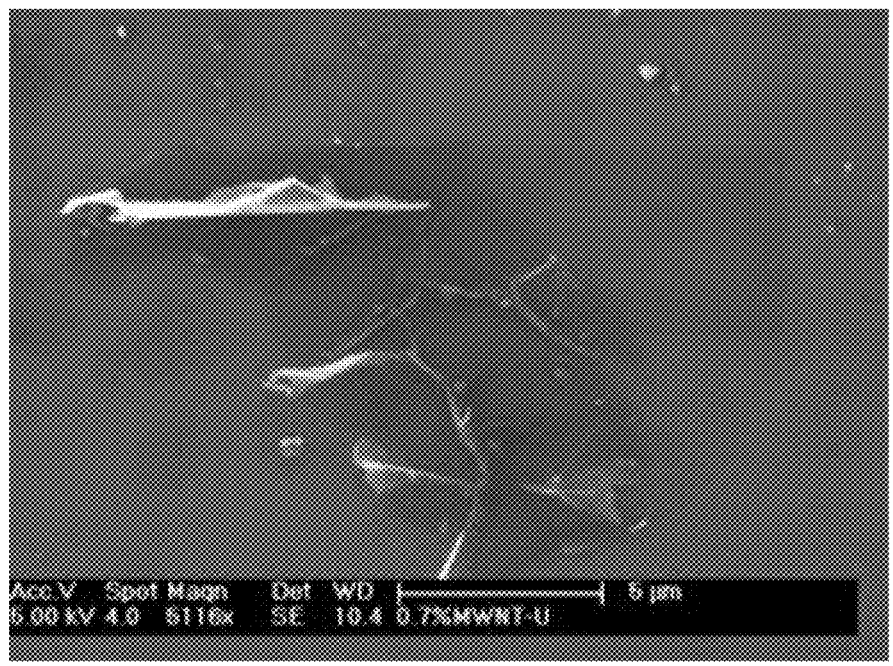
FIG. 6e shows a typical SEM image of GO produced after 5 hours of electrolysis.
Figure 6F:
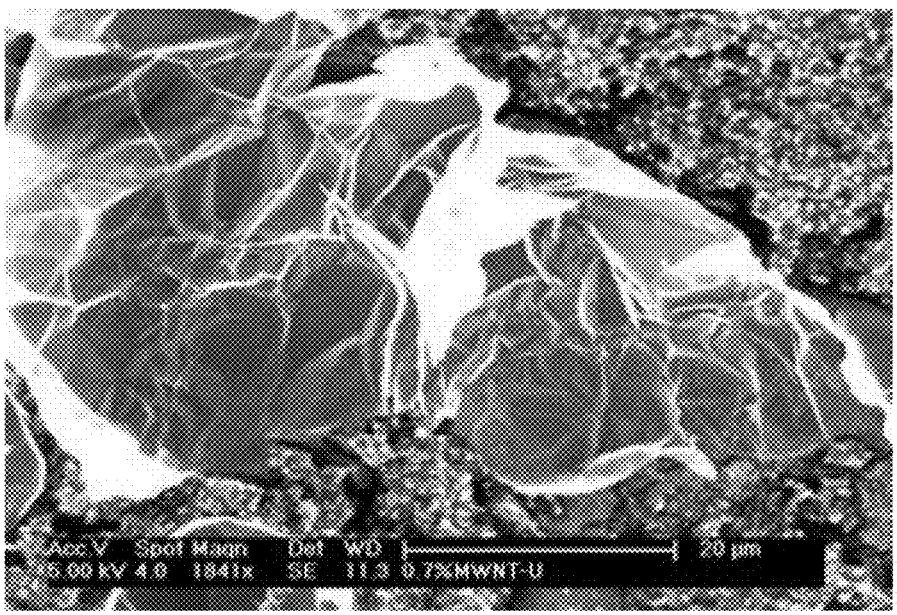
FIG. 6f shows the comparative SEM image showing the charging of the of GO sheet when nitric acid was added to the citrate containing electrolyte according to Example 8.

To understand the reaction mechanisms, samples were taken of the electrolyte at different intervals and subjected to the SEM and TEM analysis. FIG. 6 shows different structures at different stages of the process. At the first stage of the process, round shape 20-100 nm particles (FIG. 6a) and nano-ribbons (FIG. 6b) resulted from the anode process. Similar particles have been reported before as a corrosion product of graphite in aqueous solutions, suggesting that the first stage of the process is mainly the reaction of graphite with hydrogen radical at the edges of the graphene plans forming water-soluble hydrocarbon/carbon crystals. In the later stage, when the intercalation starts to take place on the defects created by the corrosion reaction, several micronsized sheets were observed. These intercalations weaken the bond between the graphene sheets and increase the interlayer distance which facilitated the corrosion reaction further. Any gaseous products of the reaction may push the graphene sheets further and leads to the exfoliation. A typical GO sheet resulted after 5 hours of electrolysis (see FIG. 6c—note the aggregation of the flakes during removing the water from the suspension). The diffraction pattern of the typical GO sheet of FIG. 6c is shown in FIG. 6d. FIG. 6e shows a typical SEM image of GO produced from citrate buffer solution after 5 hours of electrolysis, and FIG. 6f shows the comparative SEM image showing the charging of the of GO sheet when nitric acid was added to the citrate containing electrolyte.

General Observations

In the above exemplary experiments, after few minutes of applying the current, the colour of the electrolyte changed from very clear transparent to yellowish then to golden, brown, dark brown and finally black. These changes in colour reflect the changes of the GO concentration in the suspension. The suspension of GO was observed to be stable for 5 weeks, showing that the GO was well dispersed in the aqueous electrolyte solution.

The powder collected from the suspension by filtration weighed 0.22 g after 6 hours of electrolysis. Also, the percentage of the non-exfoliated particles collected after centrifugation to the total loss of the graphite electrode weight was 12-20 wt. %. This low percentage indicates that the efficiency of the electro-oxidative exfoliation was high.

REFERENCES

The following documents referred to above are all incorporated herein in their entirety by reference.

[Klinowski 1998] He H, Klinowski J, Forster M, Lerf A. A new structural model for graphite oxide. Chemical Physics Letters 1998; 287:53.

[Titelman 2005] Titelman G I, Gelman V, Bron S, Khalfin R L, Cohen Y, BiancoW, Peled H. Characteristics and microstructure of aqueous colloidal dispersions of graphite oxide. Carbon 2005; 43:641.

[Dikin 2007] Dikin D A, Stankovich S, Zimney E J, Piner R D, Dommett G H B, Evmenenko G, Nguyen S T, Ruoff R S. Preparation and characterization of graphene oxide paper. Nature 2007; 448:457.

[Park 2010] Park S, Mohanty N, Suk J W, Nagaraja A, An J H, Piner R D, Cai W W, Dreyer D R, Berry V, Ruoff R S. Biocompatible, Robust Free-Standing Paper Composed of a TWEEN/Graphene Composite. Advanced Materials 2010; 22:1736.

[Chen 2009] Chen C, Yang Q W H, Yang Y, Lv W, Wen Y, Hou P W X, Wang M, Cheng H W M. SelfWAssembled FreeWStanding Graphite Oxide Membrane. Advanced Materials 2009; 21:3007.

[Stankovich 2007] Stankovich S, Dikin D A, Piner R D, Kohlhaas K A, Kleinhammes A, Jia Y, Wu Y, Nguyen S T, Ruoff R S. Synthesis of grapheneWbased nanosheets via chemical reduction of exfoliated graphite oxide. Carbon 2007; 45:1558.

[Brodie 1859] Brodie B C. On the Atomic Weight of Graphite. Philosophical Transactions of the Royal Society of London 1859; 149:249.

[Staudenmaier 1898] Staudenmaier L. Verfahren zur Darstellung der Graphitsäure. Berichte der deutschen chemischen Gesellschaft 1898; 31:1481.

[Hummers 1958] Hummers W S, Offeman R E. PREPARATION OF GRAPHITIC OXIDE. J. Am. Chem. Soc. 1958; 80:1339.

[Dreyer 2010] Dreyer D R, Park S, Bielawski C W, Ruoff R S. The chemistry of graphene oxide. Chemical Society Reviews 2010; 39:228.

[Liu 2008] N. Liu et al, One-Step Ionic-Liquid-Assisted Electrochemical Synthesis of Ionic-Liquid-Functionalized Graphene Sheets Directly from Graphite. Adv. Funct. Mater. 2008, 18, pp. 1518-1525.

[Lu 2009] One-Pot Synthesis of Fluorescent Carbon Nanoribbons, Nanoparticles, and Graphene by the Exfoliation of Graphite in Ionic Liquids, ACS Nano, 2009, 3(8) pp. 2367-2375.

[You 2011] You, X, et al. *J. Nanosci. Nanotechnol.* 2011, Vol. 11, No. 7, pp 5965-5968.

[Milazzo, G. 1978] G. Milazzo, S. Caroli, and V. K. Sharma, Tables of Standard Electrode Potentials, Wiley, Chichester, 1978.

[Bard, A. J. 1985] A. J. Bard, R. Parsons, and J. Jordan, Standard Potentials in Aqueous Solutions, Marcel Dekker, New York, 1985.

[Bratsch S. G. 1989] S. G. Bratsch, *J. Phys. Chem. Ref. Data,* 18, 1-21, 1989.

The invention claimed is:

1. A method for the production of either one or both of (i) graphene oxide, and (ii) graphite oxide nanoplatelet structures having a thickness of less than 100 nm, in an electrochemical cell, the cell comprising:
   (a) a positive electrode that is graphitic, wherein the positive electrode is associated with an electrode cohesion element;
   (b) a negative electrode that may be graphitic or another material;
   (c) an electrolyte comprising an aqueous solution of carboxylate anions and counter ions to the carboxylate anions, the electrolyte having a hydrogen ion concentration of $<1\times10^{-1}$ mol dm$^{-3}$, wherein the counter ions to the carboxylate anions are metal cations or organic cations;
   wherein the method comprises the step of passing a current through the cell to intercalate the anions into the graphitic positive electrode so as to exfoliate the graphitic positive electrode.

2. The method of claim 1, wherein the positive electrode comprises an electrolyte-contacting surface and wherein at least half of the electrolyte-contacting surface of the positive electrode comes into direct contact with the electrode cohesion element during the step of passing the current through the cell.

3. The method of claim 1, wherein the positive electrode comprises an electrolyte-contacting surface and wherein all of the electrolyte-contacting surface of the positive electrode comes into direct contact with the electrode cohesion element during the step of passing the current through the cell.

4. The method of claim 1, wherein the electrode cohesion element is a porous filter.

5. The method of claim 4, wherein the porous filter comprises a material selected from one or more of cellulose dialysis membranes, polycarbonate membranes, and muslin cloth.

* * * * *